US012152695B1

(12) United States Patent
Buttz

(10) Patent No.: US 12,152,695 B1
(45) Date of Patent: Nov. 26, 2024

(54) APPARATUS AND METHOD FOR REPLACING A VALVE IN A WATER MAIN

(71) Applicant: AMT Water Group, LLC, Noblesville, IN (US)

(72) Inventor: Douglas G. Buttz, Arcadia, IN (US)

(73) Assignee: AMT Water Group, LLC, Noblesville, IN (US)

( * ) Notice: Subject to any disclaimer, the term of this patent is extended or adjusted under 35 U.S.C. 154(b) by 0 days.

(21) Appl. No.: 18/643,239

(22) Filed: Apr. 23, 2024

(51) Int. Cl.
*F16K 43/00* (2006.01)
*F16L 41/04* (2006.01)
*F16L 55/18* (2006.01)

(52) U.S. Cl.
CPC ............ *F16K 43/001* (2013.01); *F16L 41/04* (2013.01); *F16L 55/18* (2013.01)

(58) Field of Classification Search
CPC .......... F16K 43/001; F16L 41/04; F16L 55/18
See application file for complete search history.

(56) References Cited

U.S. PATENT DOCUMENTS

| | | |
|---|---|---|
| 478,711 A | 7/1892 | Payne |
| 807,663 A | 12/1905 | Daley et al. |

(Continued)

FOREIGN PATENT DOCUMENTS

JP 6721619 B2 4/2018

OTHER PUBLICATIONS

Van Blaricum, Vicki L. et al.; Demonstration of Pipe Corrosion Sensors at Fort Bragg, NC: Final Report on Project AR-F-317 for FY05; US Army Engineer Research and Development Center, Construction Engineering Research Laboratory; 239 pages; 2007.

(Continued)

*Primary Examiner* — Kevin R Barss
(74) *Attorney, Agent, or Firm* — Faegre Drinker Biddle & Reath LLP

(57) ABSTRACT

An apparatus for replacing a first valve connected to a water main with a second valve is disclosed and methods of use. The apparatus may comprise a housing including a top, a bottom, and at least one side. The housing may further include an access opening in the bottom providing access to an interior of the housing and a plurality of openings in the at least one side. The interior of the housing may include a plurality of workspaces, the plurality of workspaces including a first workspace and a second workspace. The first workspace being positioned closer to the top of the housing than the second workspace. The apparatus may further comprise a first movable barrier coupled to the housing and covering at least a first opening of the plurality of openings in the at least one side of the housing in a first configuration and allowing access to the first workspace of the interior of the housing in a second configuration. The apparatus may further comprise a second movable barrier coupled to the housing and covering at least a second opening of the plurality of openings in the at least one side of the housing in a first configuration and allowing access to the second workspace of the interior of the housing in a second configuration. The apparatus may further comprise at least one coupler adapted to couple the housing to the water main with the first valve aligned with the access opening in the bottom of the housing. The apparatus may further comprise a movable tool at least partially positioned in the interior of the housing and at least one divider movable between a first position wherein the movable tool may move from the first workspace to the second workspace and a second position wherein the movable tool is prevented from moving from the first workspace to the second workspace.

28 Claims, 18 Drawing Sheets

(56) References Cited

U.S. PATENT DOCUMENTS

| | | | |
|---|---|---|---|
| 2,566,502 | A | 9/1951 | Smith |
| 2,867,034 | A | 1/1959 | Bowan |
| 2,983,477 | A | 5/1961 | Merrill |
| 3,598,428 | A | 8/1971 | Smith et al. |
| 3,845,789 | A | 11/1974 | Rohrer |
| 3,905,396 | A | 9/1975 | Peterson |
| 4,090,534 | A | 5/1978 | Martin et al. |
| 4,132,083 | A | 1/1979 | McGrath |
| 4,175,581 | A | 11/1979 | Peterson |
| 4,305,282 | A | 12/1981 | Hunt |
| 5,732,728 | A * | 3/1998 | Maichel ............... F16L 55/105 251/327 |
| 5,819,385 | A | 10/1998 | Klaptchuk |
| 5,988,199 | A | 11/1999 | Ryan et al. |
| 6,712,086 | B1 | 3/2004 | Fails |
| 6,843,108 | B1 | 1/2005 | Hunt |
| 6,871,401 | B1 | 3/2005 | Blankenship |
| 7,111,817 | B2 | 9/2006 | Teti et al. |
| 7,832,076 | B2 | 11/2010 | Fischer |
| 9,032,989 | B2 | 5/2015 | Floyd et al. |
| 11,162,625 | B2 | 11/2021 | Powers |
| 2001/0010233 | A1* | 8/2001 | Sato ..................... F16L 55/105 137/318 |
| 2001/0017159 | A1* | 8/2001 | Sato ....................... F16L 41/04 137/318 |
| 2012/0160337 | A1* | 6/2012 | Murphy .................... F16K 3/30 138/94 |
| 2013/0098473 | A1 | 4/2013 | Wassil, Jr. |
| 2020/0386346 | A1* | 12/2020 | Horikawa ............ F16K 3/0254 |
| 2021/0364116 | A1* | 11/2021 | Yamanouchi ........... F16K 1/221 |
| 2023/0041200 | A1* | 2/2023 | Maichel .................... F16K 1/22 |
| 2023/0304589 | A1* | 9/2023 | Nakazato .................. F16K 3/02 |

OTHER PUBLICATIONS

World Health Organization and Plumbing Council; Health Aspects of Plumbing; section 12, p. 60; 1 page; 2006.

U.S. Army; Field Manual; Plumbing, Pipe Fitting, and Sewerage; 340 pages; Aug. 31, 2001.

A.Y. McDonald Mfg. Co; A Deep Dive Into Corporation Steps; https://www.aymcdonald.com/en/news/2023/February/a-deep-dive-into-corporation-stops—195; 3 pages; Feb. 16, 2023.

* cited by examiner

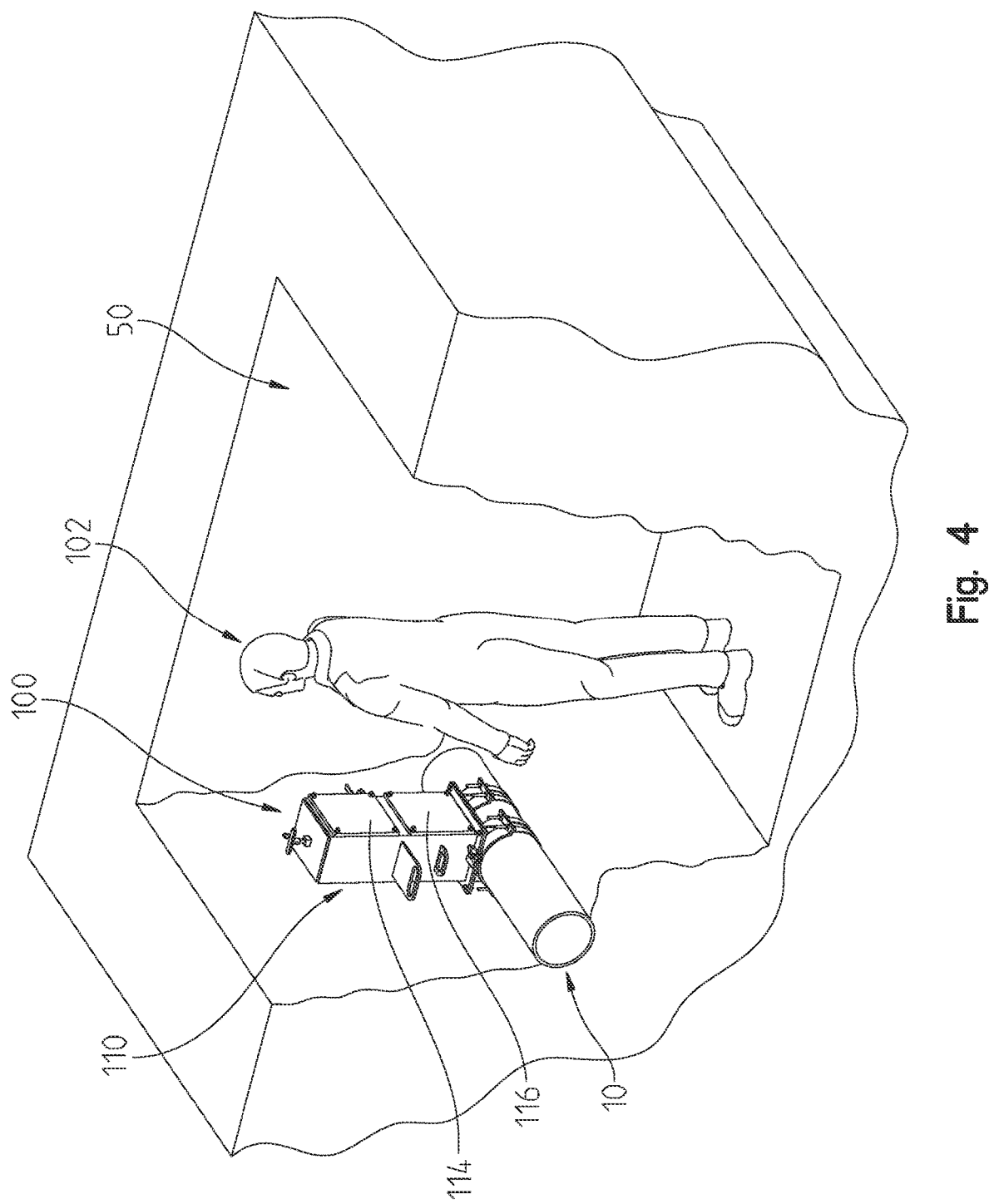

APPARATUS AND METHOD FOR REPLACING A VALVE IN A WATER MAIN

FIELD

The present invention relates generally to an apparatus and method for replacing a first valve in a water main and more particularly to an apparatus and method for replacing a first corporation stop in a water main with a second corporation stop.

BACKGROUND

At various times, such as during construction, a service water line must be connected to an existing water main line if the building or other point of use is going to have water supplied from the existing water main line. Traditionally, an operator would unearth the existing water main line (create a pit) and use a saddle tap or a direct tap to create a hole in the wall of the existing water main line and to leave a connection having a valve (often referred to as a corporation stop available from Ford Meter Box Company) behind after the tapping operation. The service water line may then be connected to the connection, such as the opposite end of the valve, and the valve opened to supply water to the service water line from the existing water main line.

Referring to FIG. 1, an exemplary layout is shown. A water main line 10 is shown running along a first side of a roadway 12. A first building 20A and a second building 20B are connected to water main line 10 through respective service assemblies 22A, 22B. Each service assembly includes a connection point 24 to water main line 10 with a respective valve 26. Valve 26 may be a corporation stop having a housing with a first end coupled to water main line 10, a second end coupled to a service line 28, and a valve body positioned between the first end and the second end. The valve body being movable between a first position wherein water is communicated from water main line 10 through the housing to service line 28 and a second position wherein water is prevented from flowing from water main line 10 to service line 28. The water in water main line 10 is pressurized.

A second end of each respective service line 28 is coupled to a second valve 30 positioned in a respective meter pit 32. The meter pit 32 includes a water meter 34 and the second valve 30 is operatively coupled to a first side of the water meter 34. A building line 40 is also coupled to the water meter 34 in the water meter pit 32 through a third valve 42. Finally, water is communicated to a water system of the building from the building line 40 through a fourth valve 44. When each of valves 26, 30, 42, and 44 are open water is communicated from water main line 10 to the respective building 20.

At times, valve 26 needs to be replaced. Referring to FIG. 2, one known way to replace a valve 26 is to shutoff an existing valve, such as valve 26A or 26B and install a new valve, such valve 26C or 26D at a new connection point, such as 24C or 24D. This new valve 26C,D is coupled to a new water meter 34C,D positioned in a new water meter pit 32C,32D which communicates water to the respective building 20A,B through new building lines 40C,D which are connected to building lines 40A,B after building lines 40A,B are disconnected from the prior water meters 34A,B. This methodology requires the digging of a pit at each of connection points 24A,B to shutoff valves 26A,B, digging a pit at each of connection points 24C,D to install the new valves 26C,D on water main line 10, digging a pit at each location for meter pit 32C,D to install meter pits 32C,D and trenching for the placement of each of service lines 28C,D and building lines 40C,D. Additionally, the spacing of each of connection points 24A-D must meet code requirements for tapping into water main line 10.

SUMMARY

In an exemplary embodiment of the present disclosure, an apparatus for replacing an existing valve coupled to a water main line with a new valve is disclosed. In another exemplary embodiment of the present disclosure, a method of replacing an existing valve coupled to a water main line with a new valve is disclosed which requires only a single pit to dug in the ground. In yet another exemplary embodiment of the present disclosure, a method of replacing an existing valve coupled to a water main line with a new valve is disclosed which does not alter any line components from the water meter pit to the building being served.

In an exemplary embodiment of the present disclosure, an apparatus for replacing a first valve connected to a water main with a second valve is provided. The apparatus may comprise a housing. The housing may include a top, a bottom, and at least one side. The housing may further include an access opening in the bottom providing access to an interior of the housing and a plurality of openings in the at least one side. The interior of the housing may include a plurality of workspaces. The plurality of workspaces may include a first workspace and a second workspace. The apparatus may further comprise a first movable barrier coupled to the housing and covering at least a first opening of the plurality of openings in the at least one side of the housing in a first configuration and allowing access to the first workspace of the interior of the housing in a second configuration. The apparatus may further comprise a second movable barrier coupled to the housing and covering at least a second opening of the plurality of openings in the at least one side of the housing in a first configuration and allowing access to the second workspace of the interior of the housing in a second configuration. The apparatus may further comprise a coupling assembly adapted to couple the housing to the water main with the first valve aligned with the access opening in the bottom of the housing. The apparatus may further comprise a movable tool at least partially positioned in the interior of the housing. The apparatus may further comprise at least one divider movable between a first position wherein the movable tool may move from the first workspace to the second workspace and a second position wherein the movable tool is prevented from moving from the first workspace to the second workspace. The first workspace may be positioned closer to the top of the housing than the second workspace.

In an example thereof, the housing has a longitudinal axis, the at least one divider may intersect the longitudinal axis in the second position and be spaced apart from the longitudinal axis in the first position. In a variation thereof, the movable tool may be aligned with the longitudinal axis and may be both rotatable about the longitudinal axis and translatable along the longitudinal axis. In another variation thereof, the movable tool may include an interface configured to couple to the first valve. In a further variation thereof, the interface of the movable tool may be removably coupled to a shaft of the movable tool. The shaft may have a length longer than a height of the housing. In still another variation thereof, the interface of the movable tool may include a base having a recess to receive the first valve. The interface may further include a first coupler positionable on a first side of the first valve and movable between a first position spaced apart from the first valve and a second position contacting the first side of the first valve. The interface may further include a second coupler positionable on a second side of the first valve and movable between a first position spaced apart from the first valve and a second position contacting the second side of the first valve. In yet still another variation thereof, the interface may be adapted to receive an end of the first valve and a fastener which engages a sidewall of the first valve. In still a further variation thereof, the interface of the movable tool may be configured to be decoupled from the shaft and replaced with a second interface of the movable tool. The second interface may be configured to engage the water main. In another still variation thereof, the second interface may include a drill bit adapted to increase an opening in the water main from a first size to a second size. In yet another still variation thereof, the second interface may include a tap adapted to tap threads in an opening in the water main.

In another example thereof, the apparatus may further comprise a first valve actuatable from an exterior of the housing and in fluid communication with the first workspace of the interior of the housing and a second valve actuatable from the exterior of the housing and in fluid communication with the second workspace of the interior of the housing.

In yet another example thereof, the movable tool may be actuatable from an exterior of the housing.

In still another example thereof, the at least one divider may be actuatable from an exterior of the housing to move the at least one divider between the first position and the second position. In a variation thereof, the at least one divider may be translatable between the first position and the second position.

In a further still example thereof, the first movable barrier may permit visual inspection of the first workspace of the interior of the housing in the first configuration and the second movable barrier may permit visual inspection of the second workspace of the interior of the housing in the first configuration. In a variation thereof, the first movable barrier includes at least a transparent portion and the second movable barrier includes at least a transparent portion.

In yet still another example thereof, the coupling assembly may be adapted to surround a water main line of the water main. In a variation thereof, the coupling assembly may include a base having an opening. The coupling assembly may further include a first saddle. The first saddle may be positioned on a first side of the opening in the base. The coupling assembly may further include a second saddle positioned on a second side of the opening in the base such that the opening in the base is between the first saddle and the second saddle. In a variation thereof, the base is coupled to the bottom the housing. In another variation thereof, the coupling assembly may further include a seal positioned in the opening in the base. The seal may include an opening through which the first valve may be accessed from the interior of the housing when the apparatus is coupled to the water main line. The seal may direct water from the water main above the base into the interior of the housing and may limit water from the water main being discharged from underneath the base.

In a further example thereof, the apparatus may further comprise at least one alignment member which in a first position relative to the housing is spaced a first distance from the movable tool to restrict a movement of the moveable tool laterally within the second workspace of the housing and in a second position relative to the housing is spaced a second distance from the movable tool, the second distance being greater than the first distance.

In another example thereof, the apparatus may further comprise a plurality of alignment members which may be movable relative to the housing to capture a shaft of the moveable tool in the second workspace of the housing to restrict a movement of the moveable tool laterally within the second workspace of the housing.

In yet another example thereof, the water main may include a water main line.

In still yet another example thereof, the water main may include a water main line and a saddle coupled to the water main line.

In another example thereof, a method of replacing a first valve coupled to a water main with a second valve is provided. The method may comprise the steps of: (a) coupling the movable tool to the first valve; (b) rotatably actuating the movable tool to decouple the first valve from the water main; (c) moving the first valve with the movable tool from the second workspace of the interior of the housing to the first workspace of the interior of the housing; (d) moving the at least one divider from the first position to the second position; (e) placing the first movable barrier in the second configuration to permit access to the first workspace of the interior of the housing from an exterior of the housing; (f) decoupling the first valve from the movable tool within the first workspace of the interior of the housing; (g) coupling the second valve to the movable tool within the first workspace of the interior of the housing; (h) placing the first movable barrier in the first configuration; (i) moving the at least one divider from the second position to the first position; (j) moving the second valve with the movable tool from the first workspace of the interior of the housing to the second workspace of the interior of the housing; and (k) rotatably actuating the movable tool to couple the second valve to the water main. In a variation thereof, the method may further comprise steps (l) prior to step (e) opening a drain valve in fluid communication with the second workspace of the interior of the housing to communicate water from the second workspace of the interior of the housing to a location located outside of the housing and (m) prior to step (k) and subsequent to step (h) closing the drain valve in fluid communication with the second workspace of the interior of the housing. In another variation thereof, the method may further comprise steps (n) subsequent to step (e) opening another drain valve in fluid communication with the first workspace of the interior of the housing to communicate water from the first workspace of the interior of the housing to the exterior of the housing; and (m) prior to step (k) closing the another drain valve in fluid communication with the first workspace of the interior of the housing. In a further variation thereof, the method may further comprise steps subsequent to step (b) and prior to step (k) including (o) coupling a drill bit to the movable tool; (p) enlarging an opening in the water main to which the first valve was connected from a first size to a second size; and (q) tapping the opening of the second size.

Additional features and advantages will become apparent to those skilled in the art upon consideration of the following detailed description of illustrative embodiments exemplifying the best mode of carrying out the invention as presently perceived.

BRIEF DESCRIPTION OF THE DRAWINGS

The detailed description of the drawings particularly refers to the accompanying figures in which:

FIG. 4 illustrates an exemplary exposed water mail line with an operator positioned adjacent thereto in a pit next to an apparatus for replacing a valve coupled to the water main line;

Corresponding reference characters indicate corresponding parts throughout the several views. Unless stated otherwise the drawings are proportional.

DETAILED DESCRIPTION OF THE DRAWINGS

The embodiments described herein are not intended to be exhaustive or be limited to the precise forms disclosed. Rather, the embodiments selected for description have been chosen to enable one skilled in the art to practice the invention. Although the disclosure is described as in the context of replacing a valve coupled to a water main line, it should be understood that the concepts presented may be used in various applications and should not be limited to use in connection with water meter placement.

The exemplary embodiments disclosed herein may be used for multiple applications. In embodiments, the disclosed embodiments may be used to remove a valve from a water main line known as a direct tap. The valve removed may be a corporation stop that contains lead. Additionally, the disclosed embodiments may be used to replace the removed valve with a replacement valve, such as a valve that does not include lead. Further, the size of the replacement valve may be larger than the removed valve. For example, the disclosed embodiments may enlarge the opening in the water main line and the replacement valve may be for a 1.0 inch service line while the removed valve was for a 0.75 inch service line.

In embodiments, the disclosed embodiments may be used to remove a valve from a saddle placed around a water main line known as a saddle tap. The valve removed may be a corporation stop that contains lead. Additionally, the disclosed embodiments may be used to replace the removed valve with a replacement valve, such as a valve that does not include lead. Further, the size of the replacement valve may be larger than the removed valve. For example, the disclosed embodiments may enlarge the opening in the water main line and the replacement valve may be for a 1.0 inch service line while the removed valve was for a 0.75 inch service line.

Figure 1:
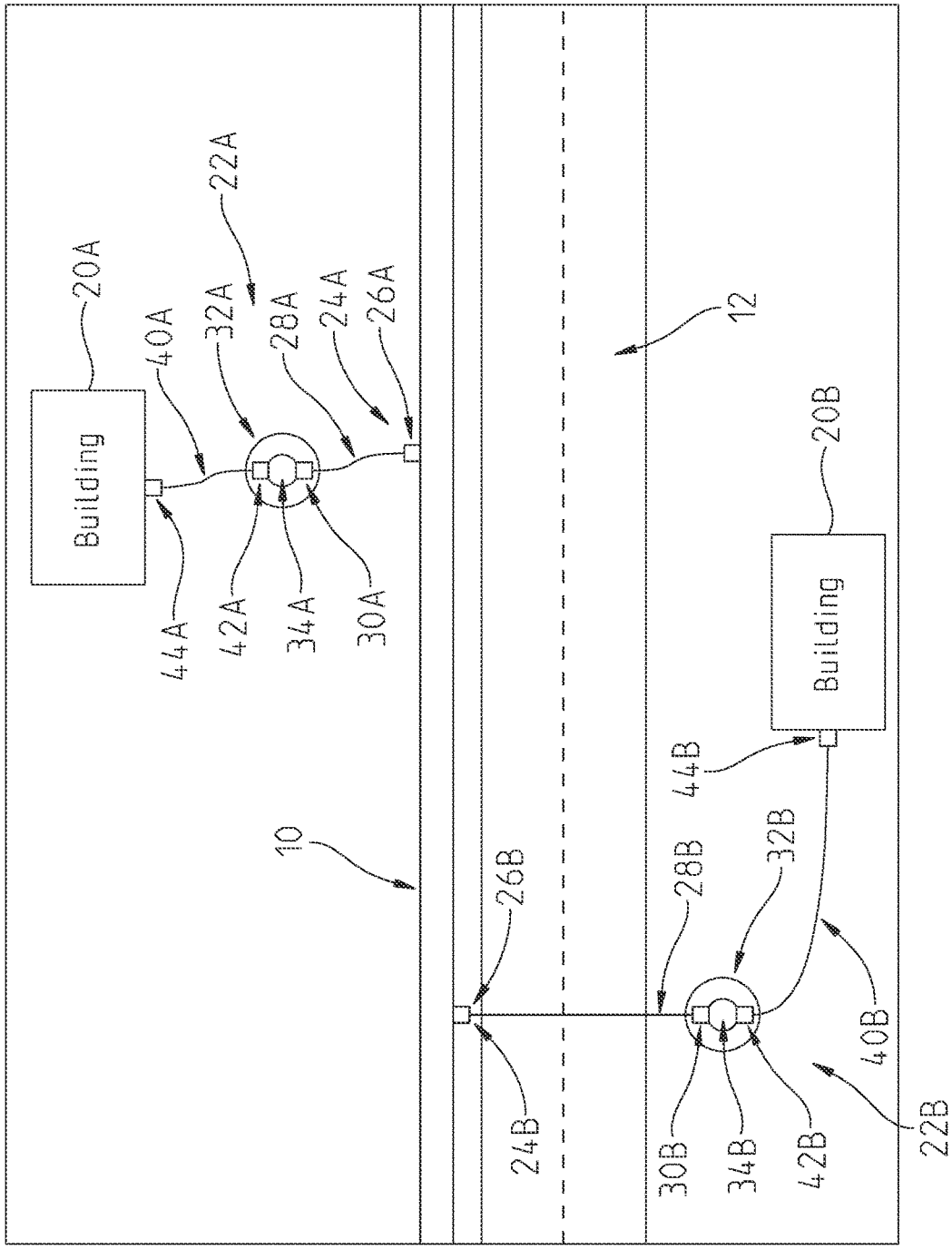
FIG. 1 illustrates a plan diagrammatical view of buildings connected to a water main line.
Figure 2:
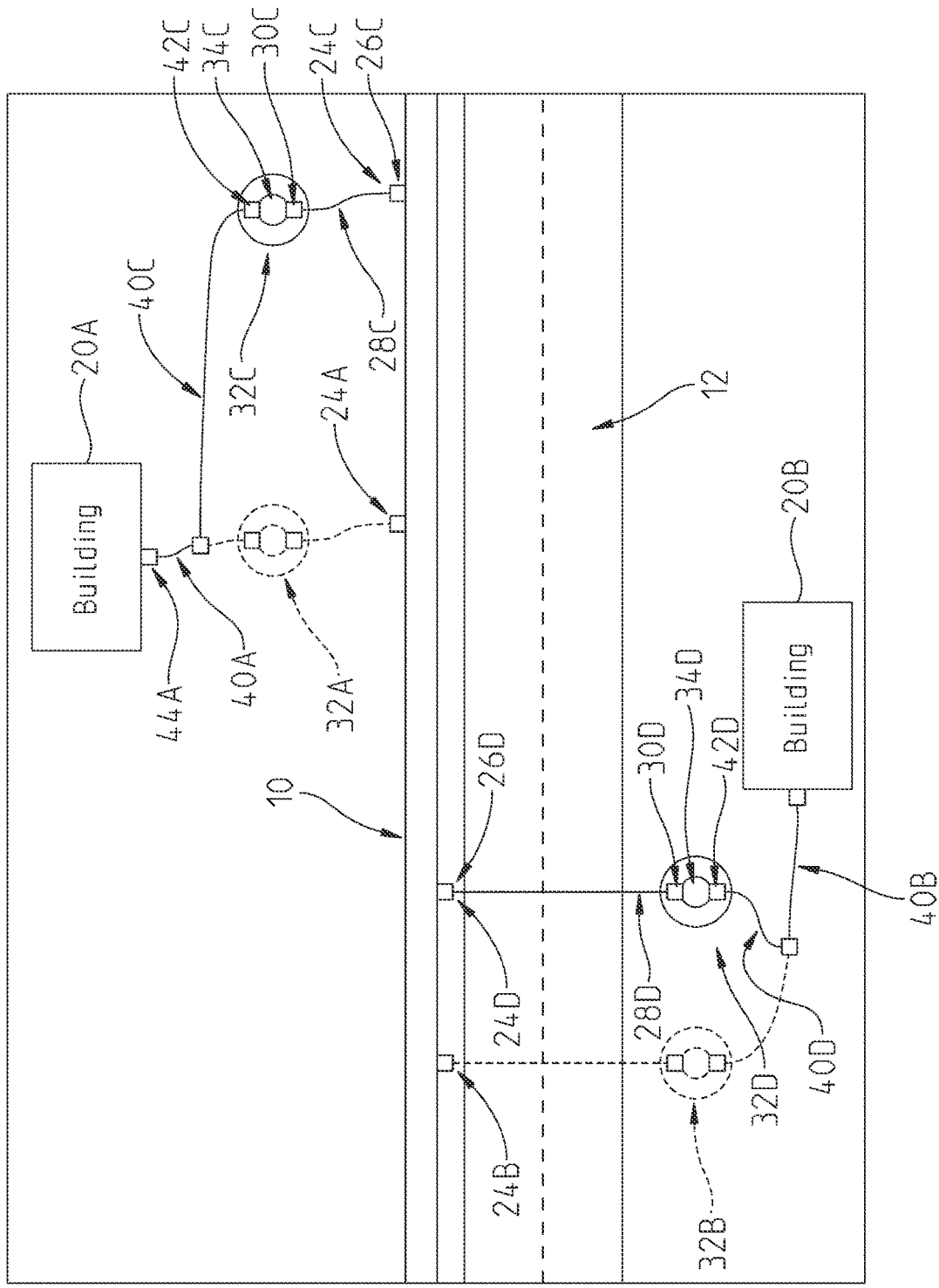
FIG. 2 illustrates a plan diagrammatical view of an existing methodology for connecting the buildings of FIG. 1 to new connection points in the water main line.
Figure 3:
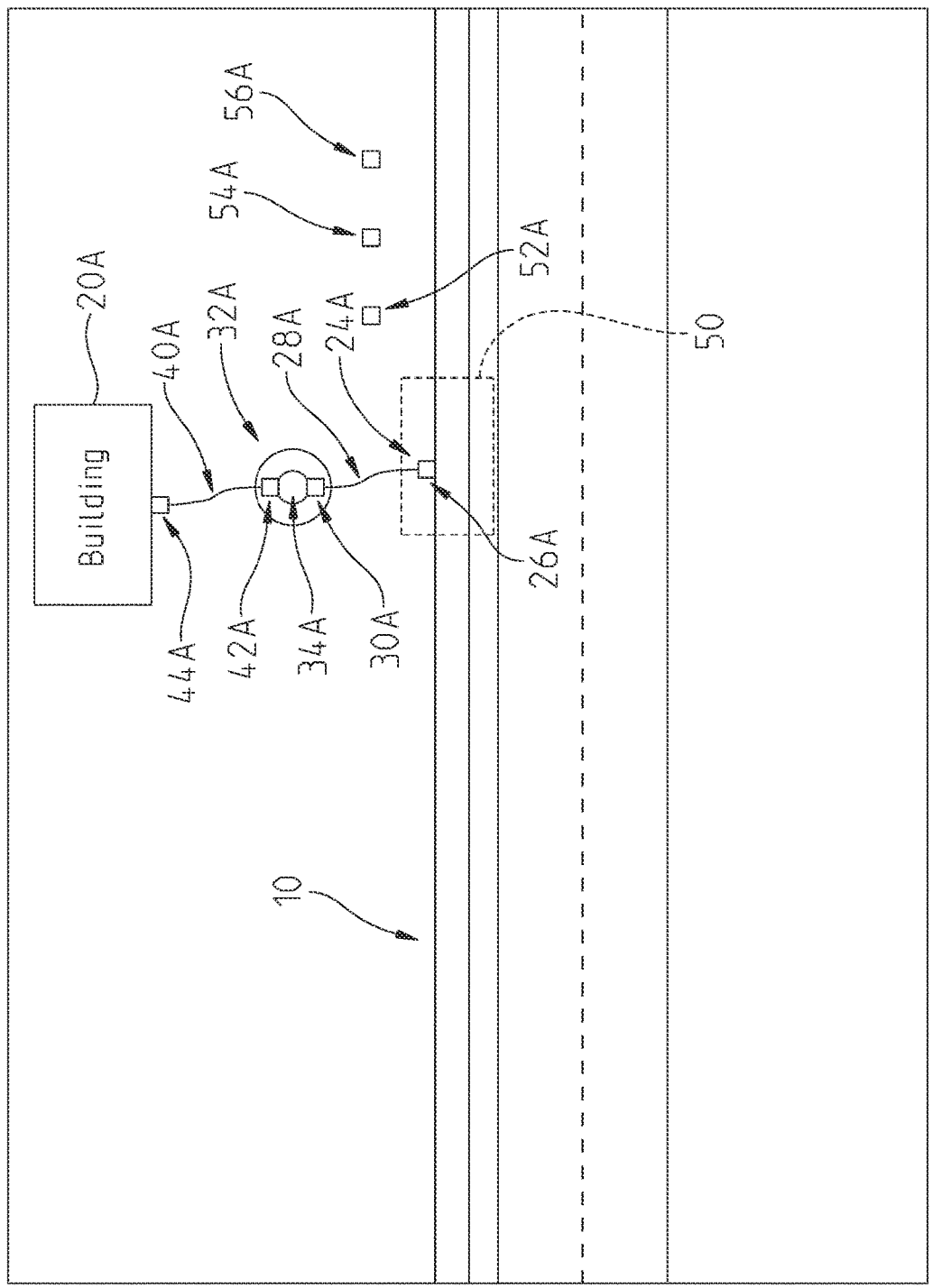
FIG. 3 illustrates a plan diagrammatical view of an exemplary installation methodology.

Referring to FIG. 3, an exemplary methodology for replacing a valve 26A coupled to water main line 10 is shown. As shown in FIG. 3, a single pit 50 is dug about water main line 10 exposing water main line 10 and connection point 24A. In this pit 50, valve 26A is replaced with a different valve 52A. Further, while service line 28A is disconnected from water main line 10, each of valve 30A and valve 42A may be replaced with valve 54A and valve 56A, respectively. In embodiments each of valve 26A, valve 30A, valve 42A, valve 52A, valve 54A, and valve 56A are corporation stops. In some embodiments, service line 28A may also be replaced with a new service line. For example, a splitting tool may be pulled through service line 28A from one of pit 50 and meter pit 32A to the other of pit 50 and meter pit 32A. The splitting tool expands the existing service line 28A and pulls a new service line behind it to replace service line 28A. Exemplary tools includes the GRUNDOSPLIT brand pipe splitting tooling available from TT Technologies, Inc. located at 2020 E New York Street in Aurora, Illinois 60502. In each example, only a single pit 50 is needed to be dug and no part of service assembly 22A between meter pit 32A and building 20A is altered.

Referring to FIG. 4, an exemplary pit 50 is shown. Pit 50 exposes a portion of water main line 10. An exemplary embodiment of an apparatus 100 to replace valve 26A is shown coupled to water main line 10. An operator 102, through use of apparatus 100, is able to replace valve 26A with valve 52A while water main line 10 remains pressurized. Thus, the flow of water within water main line 10 is not disturbed. As explained in more detail herein, the operator may access an interior 112 (see FIG. 5) of a housing 110 of apparatus 100 through a first movable barrier 114 and a second movable barrier 116. Although two movable barriers are shown, a single movable barrier or three or more movable barriers may be included.

Figure 4A:
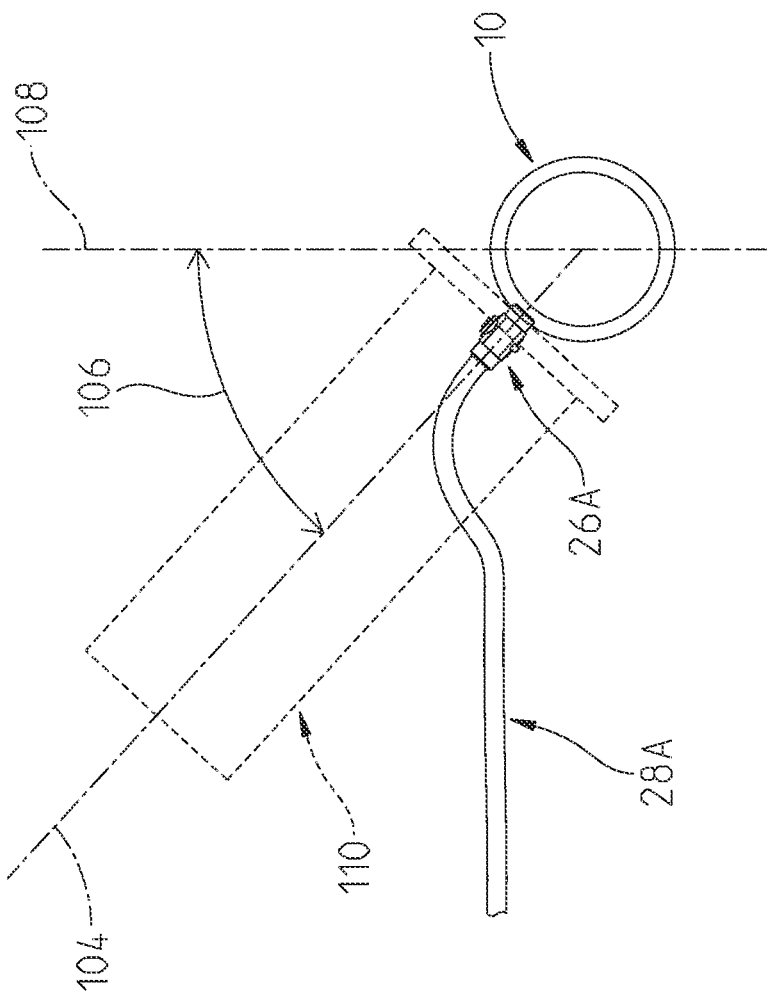
FIG. 4A illustrates an exemplary orientation of the apparatus of FIG. 4 relative to the water main line.

Although apparatus 100 is illustrated as positioned on top of water main line 10 and extending directly vertical, in application, valve 26A is often not on the direct top of water main line 10, but rather angled to one side, as shown in FIG. 4A. Thus, in use, apparatus 100 is also coupled to water main line 10 at an orientation angled to side. In the illustrated embodiment, a longitudinal axis 104 of housing 110 of apparatus 100 is aligned with valve 26A and forms an angle 106 with a vertical plane 108. In embodiments, first movable barrier 114 and second movable barrier 116 are positioned on a side of housing 110 shown in FIG. 4A and pit 50 is dug to permit operator 102 to stand to a left side of water main line 10 in FIG. 4A and to a side of apparatus 100 in-out of the page in FIG. 4A. In other embodiments, first movable barrier 114 and second movable barrier 116 are positioned on a lower side of apparatus 100 as oriented in FIG. 4A and pit 50 is dug to allow operator 102 to be positioned below apparatus 100 or first movable barrier 114 and second movable barrier 116 are positioned on an upper side of apparatus 100 as oriented in FIG. 4A and pit 50 is dug to allow operator 102 to be positioned above apparatus 100 or a secondary platform is positioned in pit 50.

Figure 5:
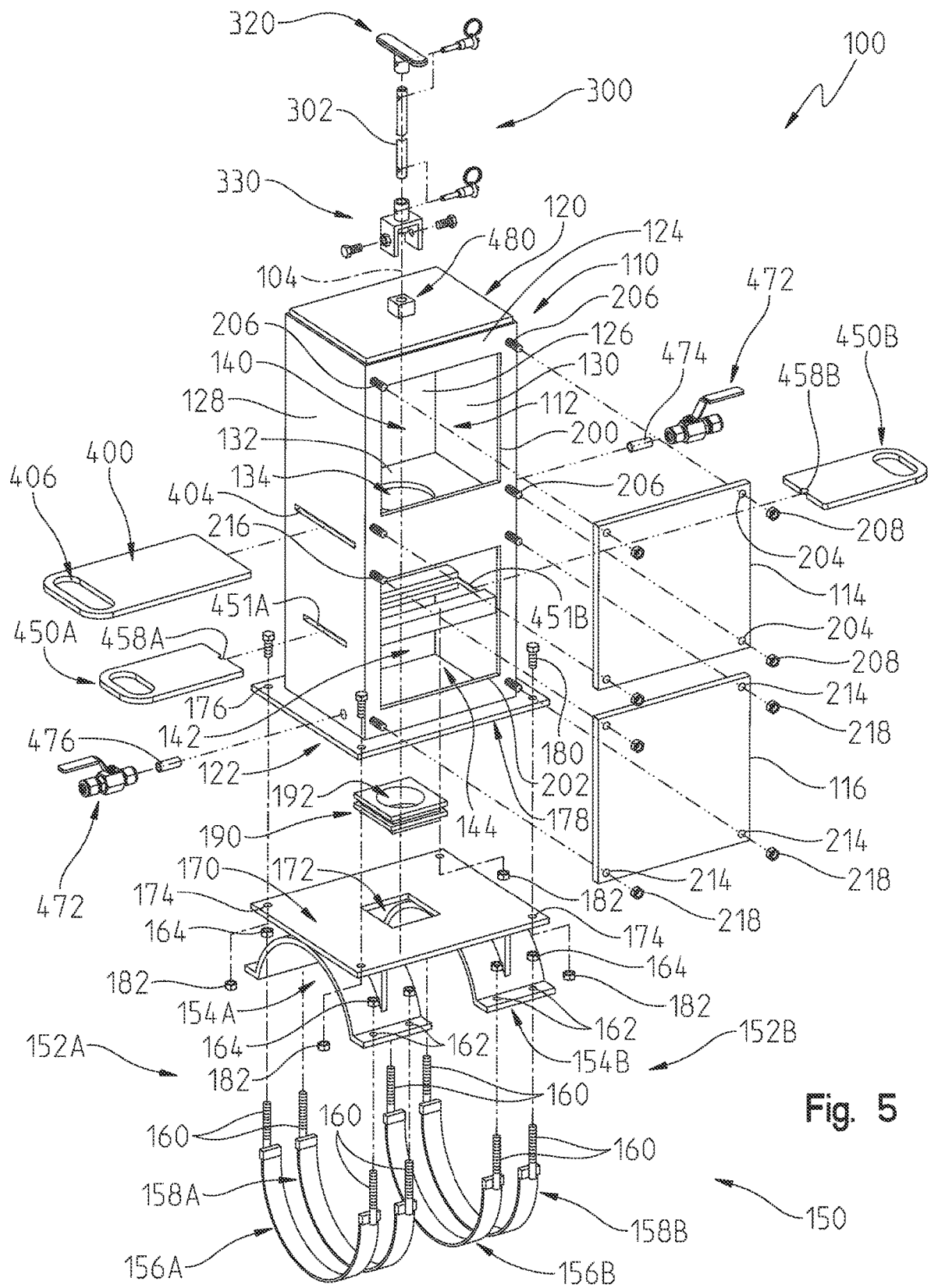
FIG. 5 illustrates exploded view of the apparatus of FIG. 4.

Referring to FIG. 5, an exploded view of apparatus 100 is shown. In the illustrated embodiment, housing 110 includes a top 120, a bottom 122, and a plurality of sides, illustratively a front side 124, a rear side 126, a left side 128, and a right side 130. In embodiments, housing 110 includes fewer or more sides. The top 120, bottom 122, front side 124, rear side 126, left side 128, and right side 130 bound interior 112. Interior 112 of housing 110 includes a plurality of workspaces, illustratively a first workspace 140 and a second workspace 142. Housing 110 includes a floor 132 which separates first workspace 140 and second workspace 142. Floor 132 includes an opening 134 which permits objects to pass between first workspace 140 which is above floor 132 and second workspace 142 which is below floor 132. Bottom 122 of housing 110 includes an access opening 144 which brings second workspace 142 into fluid communication with an exterior of housing 110.

Figure 6:
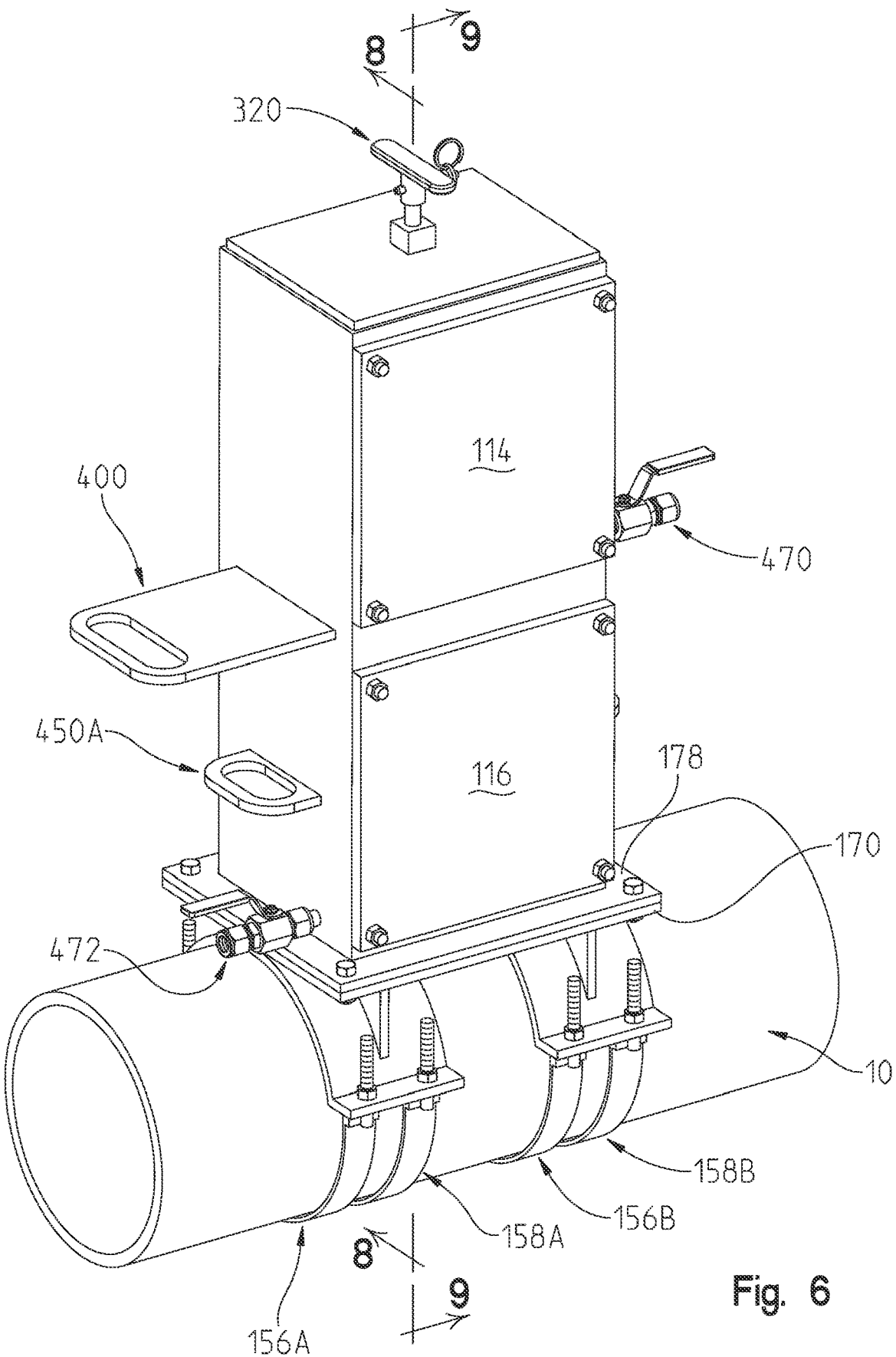
FIG. 6 illustrates a perspective view of the apparatus of FIG. 5 coupled to the water main line.
Figure 7:
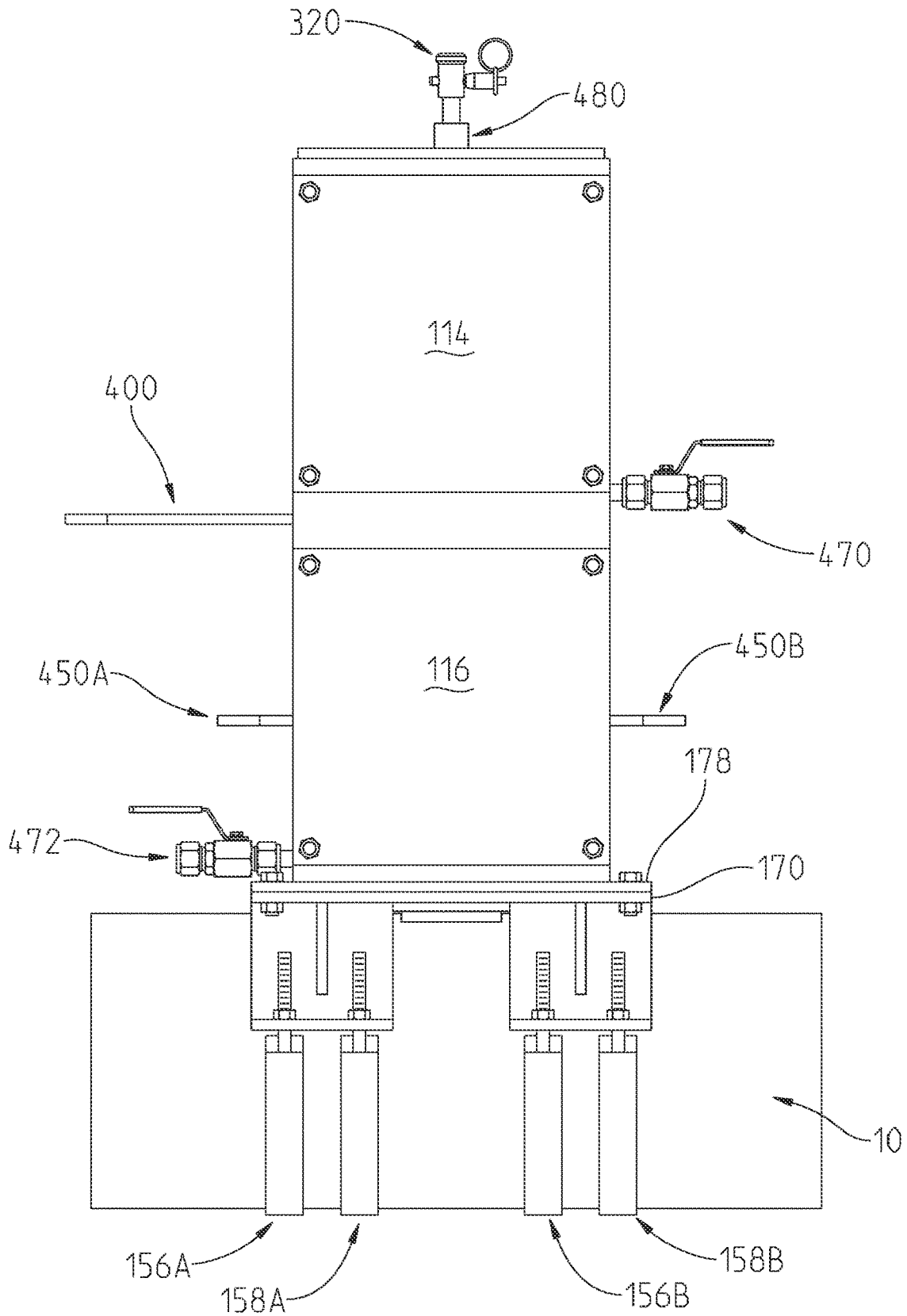
FIG. 7 illustrates a front view of the arrangement of FIG. 6.

Apparatus 100 includes a coupler assembly 150 which includes at least one coupler, illustratively a first saddle 152A and a second saddle 152B. Each of first saddle 152A and second saddle 152B includes an upper portion 154A,B and a lower portion including a first band 156A,B and a second band 158A,B. Each of first bands 156A,B and second bands 158A,B carries threaded couplers 160 which pass through openings 162 in upper portions 154A,B. Fasteners 164 are threaded onto threaded couplers 160 to tighten upper portions 152A,B and the first bands 156A,B and second bands 158A,B of the lower portions about water main line 10, as shown in FIG. 6. As shown in FIG. 6, first saddle 152A and second saddle 152B surround water main line 10. In embodiments, other couplers may be used, such as chains, straps, and other suitable couplers which may secure coupler assembly 150 to water main line 10.

Coupler assembly 150 further includes a base 170. Base 170 is shown as a single member, but in embodiments may include multiple members coupled together and/or take on different shapes. Base 170 includes an opening 172. First saddle 152A is positioned to a first side of opening 172 and second saddle 152B is positioned to a second side of opening 172 such that opening 172 in base 170 is between first saddle 152A and second saddle 152B. Base 170 includes a plurality of openings 174 and bottom 122 of housing 110 includes a corresponding number of openings 176 in a flange 178. Bolts 180 pass through openings 176 in flange 178 and openings 174 in base 170 and cooperate with fasteners 182 to secure housing 110 to base 170. In embodiments one or both of openings 174 and openings 176 are slots to allow an alignment between housing 110 and base 170 to be adjusted. In embodiments, other couplers are used to couple housing 110 to base 170, such as clamps and other suitable couplers. An advantage, among others of having housing 110 separatable from base 170 is that operator 102 may more easily situate base 170 relative to water main line 10 and secure base 170 to water main line 10 without the added weight and size of housing 110.

Coupler assembly 150 further includes a seal 190 positioned in opening 172 in base 170. Seal 190 includes an opening 192 through which the first valve 26A may be accessed from interior 112 of housing 110 when apparatus 100 is coupled to water main line 10. Seal 190 directs water from water main line 10 above base 170 into interior 112 of housing 110 and limits water from water main line 10 being discharged from underneath base 170. During assembly of apparatus 100 to water main line 10, valve 26A is aligned with the access opening 144 in bottom 122 of housing 110 through opening 192 in seal 190.

Apparatus 100 further includes first movable barrier 114 and second movable barrier 116, each of which is coupled to front side 124 of housing 110. In embodiments, one or more of first movable barrier 114 and second movable barrier 116 is coupled to another side of housing 110 or additional instances of first movable barrier 114 and/or second movable barrier 116 are included on additional sides of housing 110. Movable barrier 114 covers an opening 200 in housing 110 and second movable barrier 116 covers an opening 202 in housing 110. Opening 200 provides access to first workspace 140 of interior 112 of housing 110 and opening 202 provides access to second workspace 142 of interior 112 of housing 110.

Movable barrier 114 includes a plurality of apertures 204 which receive threaded studs 206 coupled to housing 110 and is secured to housing 110 with fasteners 208 threaded onto threaded studs 206. Similarly, movable barrier 116 includes a plurality of apertures 214 which receive threaded studs 216 coupled to housing 110 and is secured to housing 110 with fasteners 218 threaded onto threaded studs 216. Although not shown, a seal with an open center may also be provided between one or both of first movable barrier 114, second movable barrier 116 and housing 110.

Each of first movable barrier 114 and second movable barrier 116 is shown coupled to housing 110 with threaded fasteners. When affixed to housing 110 the respective first movable barrier 114 and second movable barrier 116 is in a first configuration wherein the respective opening 200 and opening 202 cannot be accessed. When removed from housing 110 the respective first movable barrier 114 and second movable barrier 116 is in a second configuration allowing access to the respective opening 200 and opening 202 and hence the respective first workspace 140 and second workspace 142. In other embodiments, first movable barrier 114 and second movable barrier 116 may be coupled to housing 110 in different manners such as with a hinge on one side and a latch on the other side to hold the respective first movable barrier 114 or second movable barrier 116 in a closed configuration and to allow opening of the respective first movable barrier 114 or second movable barrier 116 to provide access to the respective opening 200 and opening 202 and hence the respective first workspace 140 and second workspace 142 or other suitable designs which have a first configuration to close off the respective first workspace 140 and second workspace 142 and a second configuration allowing access to the respective first workspace 140 and second workspace 142.

Figure 8:
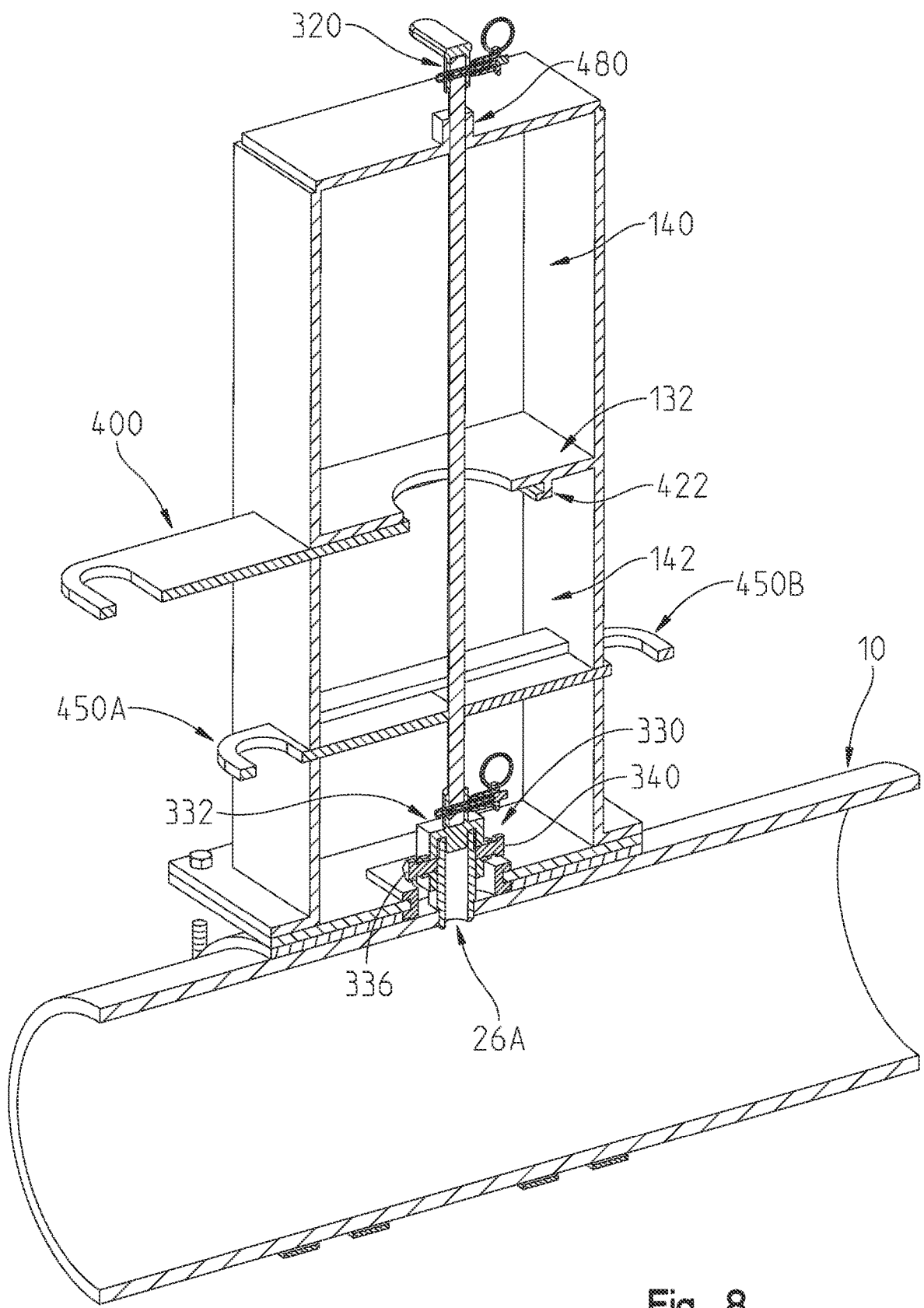
FIG. 8 illustrates a cross-sectional view of the arrangement of FIG. 6 along lines 8-8 in FIG. 6.
Figure 13:
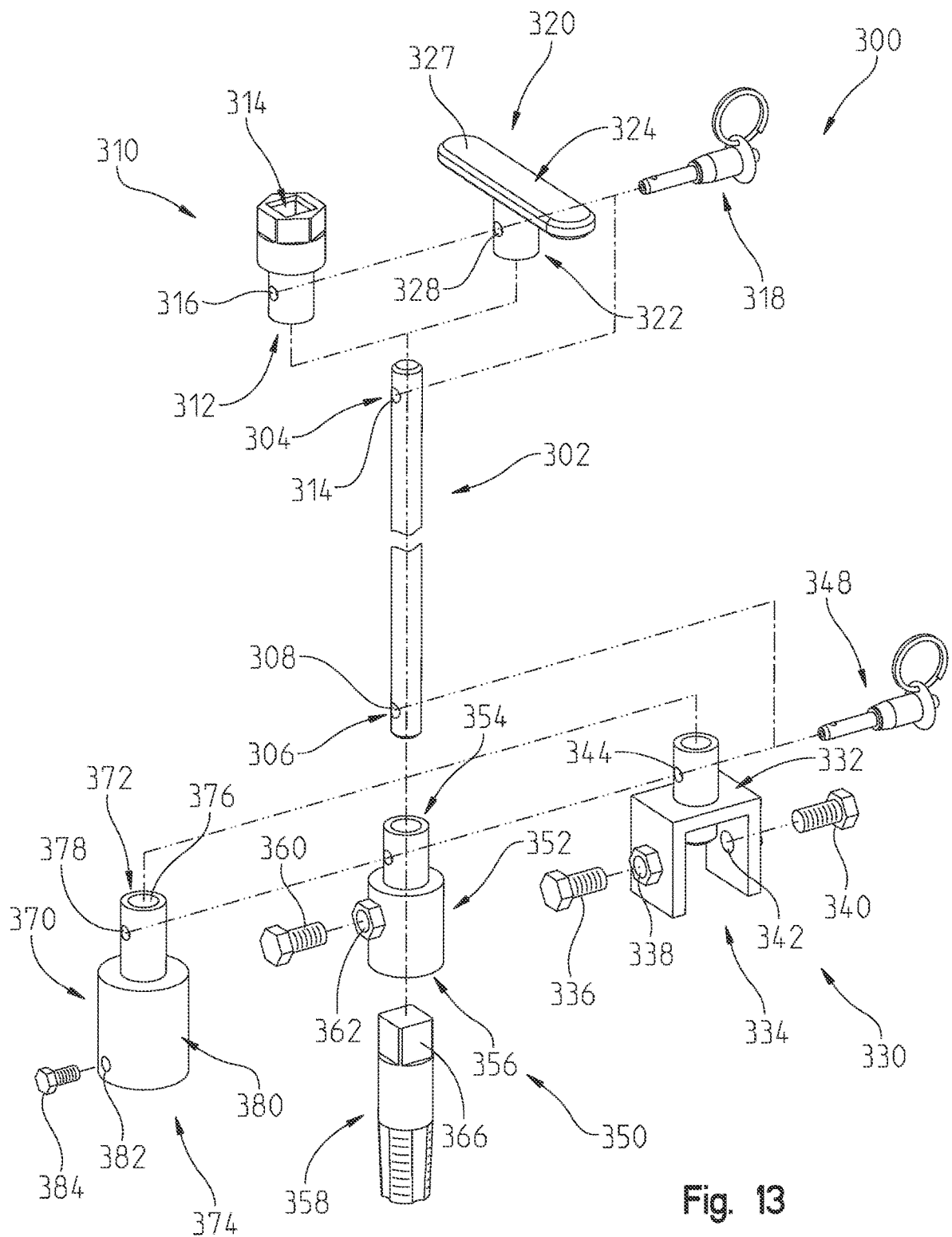
FIG. 13 is an exploded view of a movable tool of the apparatus of FIG. 5.

Apparatus 100 further includes a movable tool 300. As shown in FIG. 8, movable tool 300 has a length that may span a height of housing 110 and a length of a shaft 302 of movable tool 300 may be longer than the height of housing 110. In embodiments, movable tool 300 is aligned with longitudinal axis 104 and is both rotatable about longitudinal axis 104 and translatable along longitudinal axis 104 relative to housing 110. Referring to FIG. 13, movable tool 300 includes shaft 302 having a first end 304 and a second end 306. Various interfaces may be coupled to either first end 304 or second end 306. As shown in FIG. 13, a first interface 310 includes a first end 312 which receives first end 304 of shaft 302 and a second end 314 which has a tool interface 316 to be driven by a power tool or other tool, such as tapping tool 500 shown in FIG. 14. Each of first end 304 of shaft 302 and first end 312 of first interface 310 includes respective opening 314 and opening 316 which receive a pin 318 to couple first interface 310 to shaft 302. A second interface 320 includes a first end 322 which receives first end 304 of shaft 302 and a second end 324 which has an operatable interface, illustratively a handle 327 which may be grasped by an operator. First end 322 of second interface 320 includes respective opening 328 which receive a pin 318 along with second end 314 of first end 304 of shaft 302 to couple second interface 320 to shaft 302.

Figure 4B:
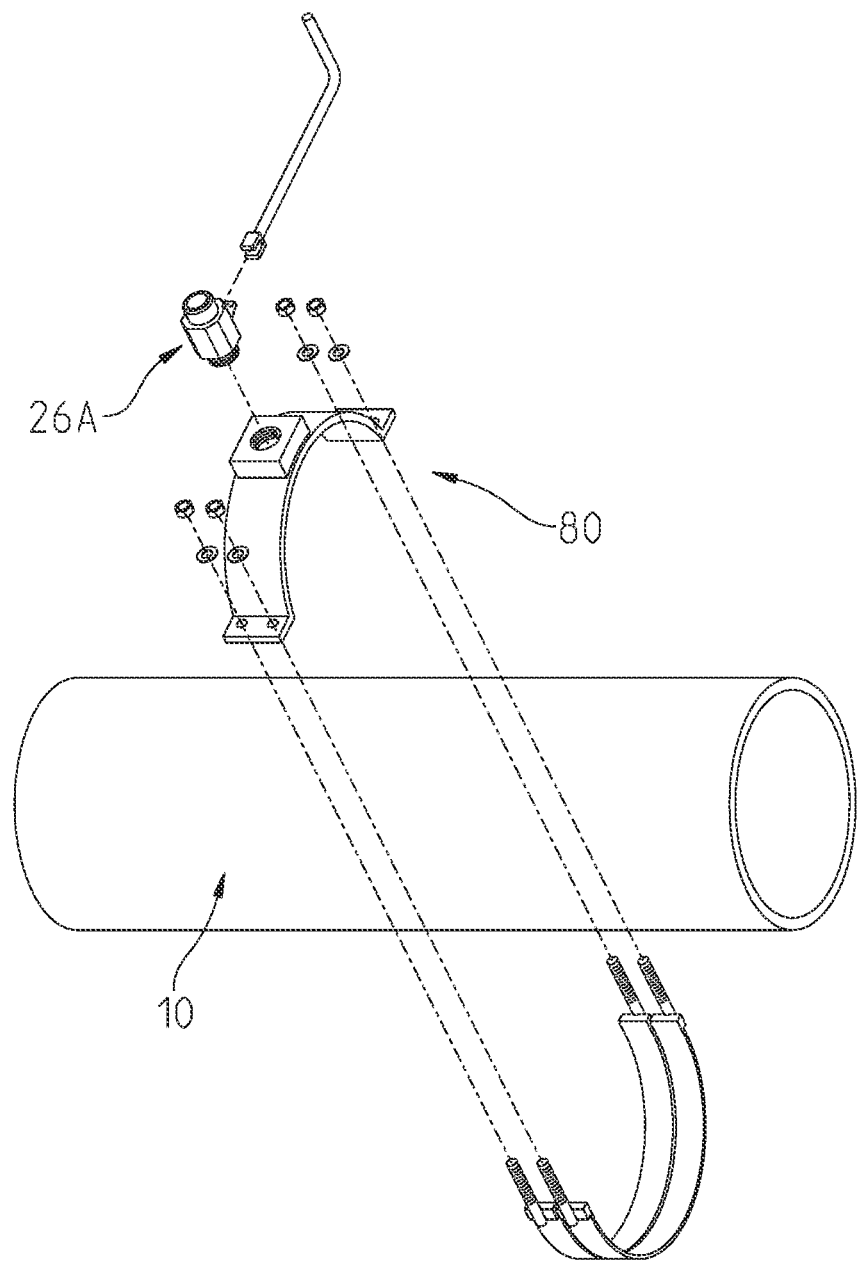
FIG. 4B illustrates an exemplary saddle for coupling a valve to a water main line.

Second end 306 of shaft 302 includes an opening 308. Various interfaces may be coupled to second end 306. In embodiments, valve 26A is directly coupled to water main line 10, such as illustrated in FIG. 4A. In embodiments, valve 26A is coupled to a saddle 80 which is in turn coupled to water main line 10, as illustrated in FIG. 4B. Once saddle 80 is coupled to water main line 10, an opening may be formed in water main line 10 which communicates water from water main line 10 to valve 26A through saddle 80. An exemplary device is shown U.S. Pat. No. 8,651,133, the entire disclosure of which is expressly incorporated by reference herein. The term "water main" as used herein should be interpreted as the water main line 10 itself for installations wherein valve 26A is directly coupled to the water main line 10 and as the combination of the water main line 10 itself and the saddle 80 placed around the water main line 10 for installations wherein valve 26A is coupled to the saddle 80 which in turn is coupled to the water main line 10. Further, disclosure herein related to interactions with the water main line 10 are also applicable to installations having saddle 80.

A first interface 330 is configured to couple to valve 26A. First interface 330 includes a base 332 having a recess 334 to receive valve 26A. First interface further includes a first coupler 336 threadably received in opening 338 of base 332 to engage a first side of valve 26A and movable between a first position spaced apart from valve 26A and a second position contacting the first side of valve 26A and a second coupler 340 threadably received in opening 342 of base 332 to engage a second side of valve 26A and movable between a first position spaced apart from valve 26A and a second position contacting the first side of valve 26A. When first coupler 336 and second coupler 340 engage valve 26A a rotation of movable tool 300 results in a corresponding rotation of valve 26A. Base 332 further includes an opening 344 which along with opening 308 of second end 306 of shaft 302 receives a pin 348 to couple first interface 330 to shaft 302.

A second interface 350 may be coupled to second end 306 of shaft 302 in place of first interface 330. Second interface 350 includes a base 352 having a first end 354 and a second end 356. First end 354 includes an opening 362 which along with opening 308 of second end 306 of shaft 302 receives pin 348 to couple second interface 350 to shaft 302. Second end 356 includes an opening to receive a variety of tool interfaces including tool interfaces which engage water main line 10. As illustrated in FIG. 13, a tap 358 is illustrated which may be received in the opening in water main line 10 after valve 26A is removed to tap new threads into the opening for coupling valve 52A to water main line 10. Tap 358 is coupled to base 352 with a coupler 360 threaded into opening 362 in base 352 and pressing against a first end 366 of tap 358. Another exemplary tool interface would be a drill bit (not shown). In embodiments, after valve 26A is removed from water main line 10 or a saddle placed around water main line 10 that carried valve 26A, a tool interface with a drill bit may be coupled to base 352 to enlarge the opening in water main line 10 or the saddle placed around water main line 10 from a first size to a second size, the second size being larger than the first side. In one example, the first size is about 75% of the second size. In a further example, the first size is about 0.75 inches and the second size is about 1.0 inch. Once the opening in water main line 10 or the saddle placed around water main line 10 is enlarged to the second size, tap 358 is coupled to base 352 to tap new threads into water main line 10 or the saddle placed around water main line 10.

Additionally, a third interface 370 configured to couple to valve 26A to remove valve 26A from water main line 10 is shown. Third interface 370 includes a base 380 and an adapter 372. Adapter 372 includes an opening 376 which receives second end 306 of shaft 302. Adapter 372 further includes an opening 378 which aligns with opening 308 in second end 306 of shaft 302 to receive pin 348. Pin 348 couples third interface 370 to shaft 302. Base 380 of third interface 370 includes an opening 382 which receives a fastener 384. In embodiments, both opening 382 of base 380 and fastener 384 are threaded and fastener 384 is threadably engaged with base 380.

Figure 13C:
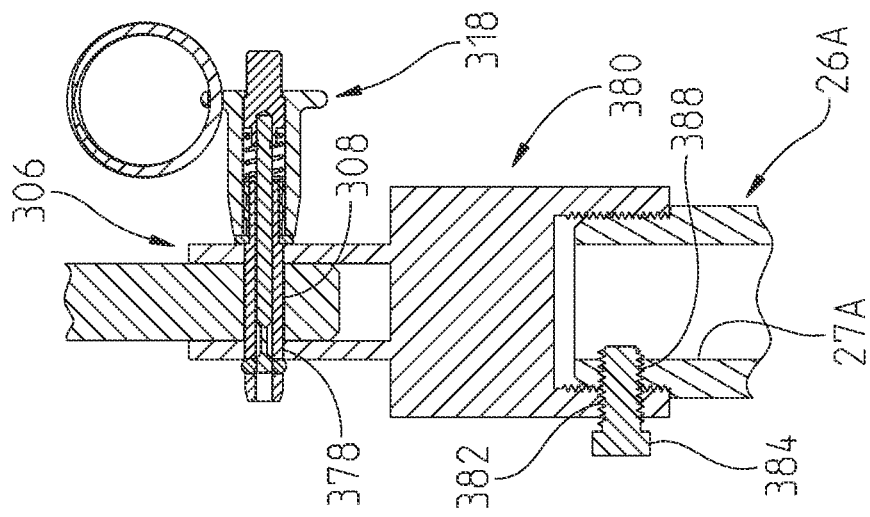
FIG. 13C is an exemplary cross-sectional view of a third embodiment of a third interface of the movable tool of FIG. 13 coupled to a valve.
Figure 13B:
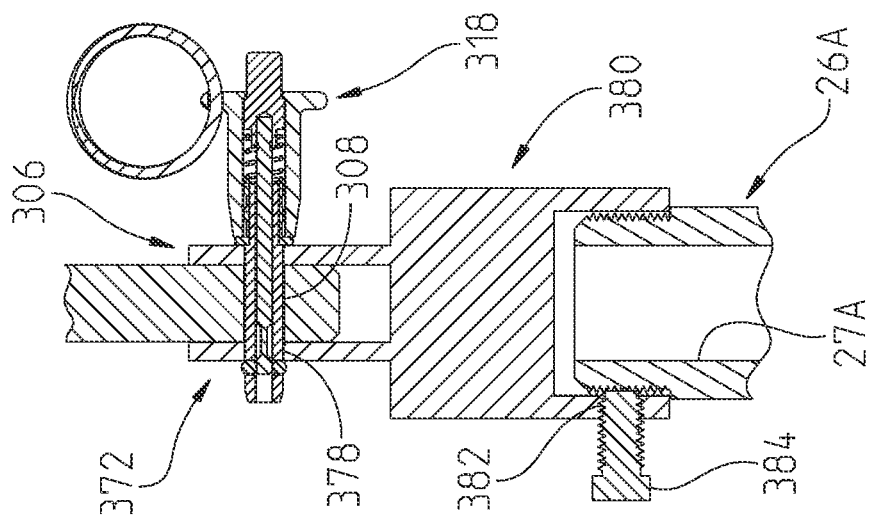
FIG. 13B is an exemplary cross-sectional view of a second embodiment of a third interface of the movable tool of FIG. 13 coupled to a valve.
Figure 13A:
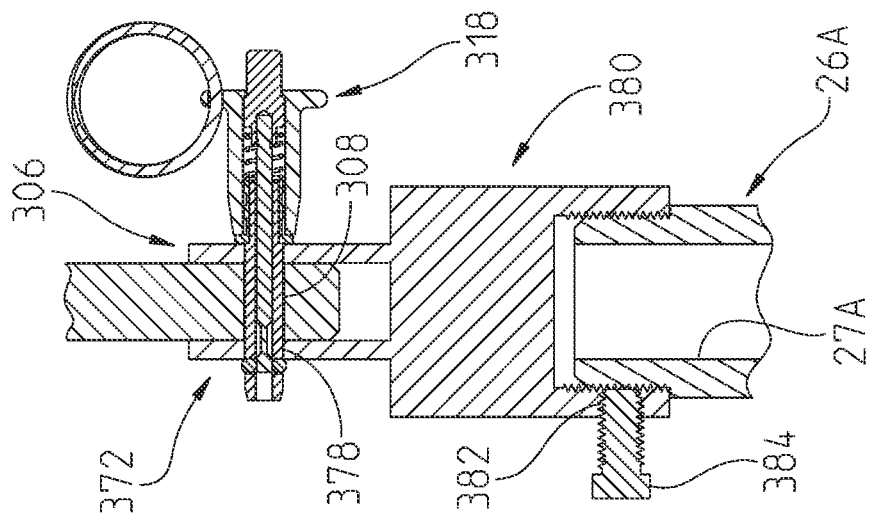
FIG. 13A is an exemplary cross-sectional view of a first embodiment of a third interface of the movable tool of FIG. 13 coupled to a valve.

As shown in FIGS. 13A-C, fastener 384 may be advanced in opening 382 of base 380 and contact wall 27A of valve 26A. Referring to FIG. 13A, in one embodiment, an internal surface of base 380 includes threads which mate with threads on wall 27A of valve 26A when an end of valve 26A is received in base 380 and fastener 384 contacts the threads on wall 27A of valve 26A. In examples, fastener 384 is made of a harder material than wall 27A of valve 26A and is advanced to at least partially flatten the threads of wall 27A of valve 26A to create a friction fit between base 380 and valve 26A which resists the relative rotation of base 380 relative to valve 26A when movable tool 300 is rotated to unthread valve 26A from water main line 10.

Referring to FIG. 13B, in one embodiment, an internal surface of base 380 is smooth and the end of valve 26A is received within base 380. Fastener 384 is advanced to contact the threads on wall 27A of valve 26A. In examples, fastener 384 is made of a harder material than wall 27A of valve 26A and is advanced to at least partially flatten the threads of wall 27A of valve 26A to create a friction fit between base 380 and valve 26A which resists the relative rotation of base 380 relative to valve 26A when movable tool 300 is rotated to unthread valve 26A from water main line 10.

Referring to FIG. 13C, in one embodiment, an internal surface of base 380 is one of threaded or smooth (illustratively threaded) and the end of valve 26A is received within base 380. An opening 388 is drilled into wall 27A of valve 26A either before valve 26A is received in base 380 or after. Opening 388 receives fastener 384. In embodiments, fastener 384 is a self-taping fastener and cuts threads into opening 388 as it is advanced. Fastener 384 is advanced into opening 388 in wall 27A of valve 26A to create a connection between base 380 and valve 26A which resists the relative rotation of base 380 relative to valve 26A when movable tool 300 is rotated to unthread valve 26A from water main line 10.

Figure 11:
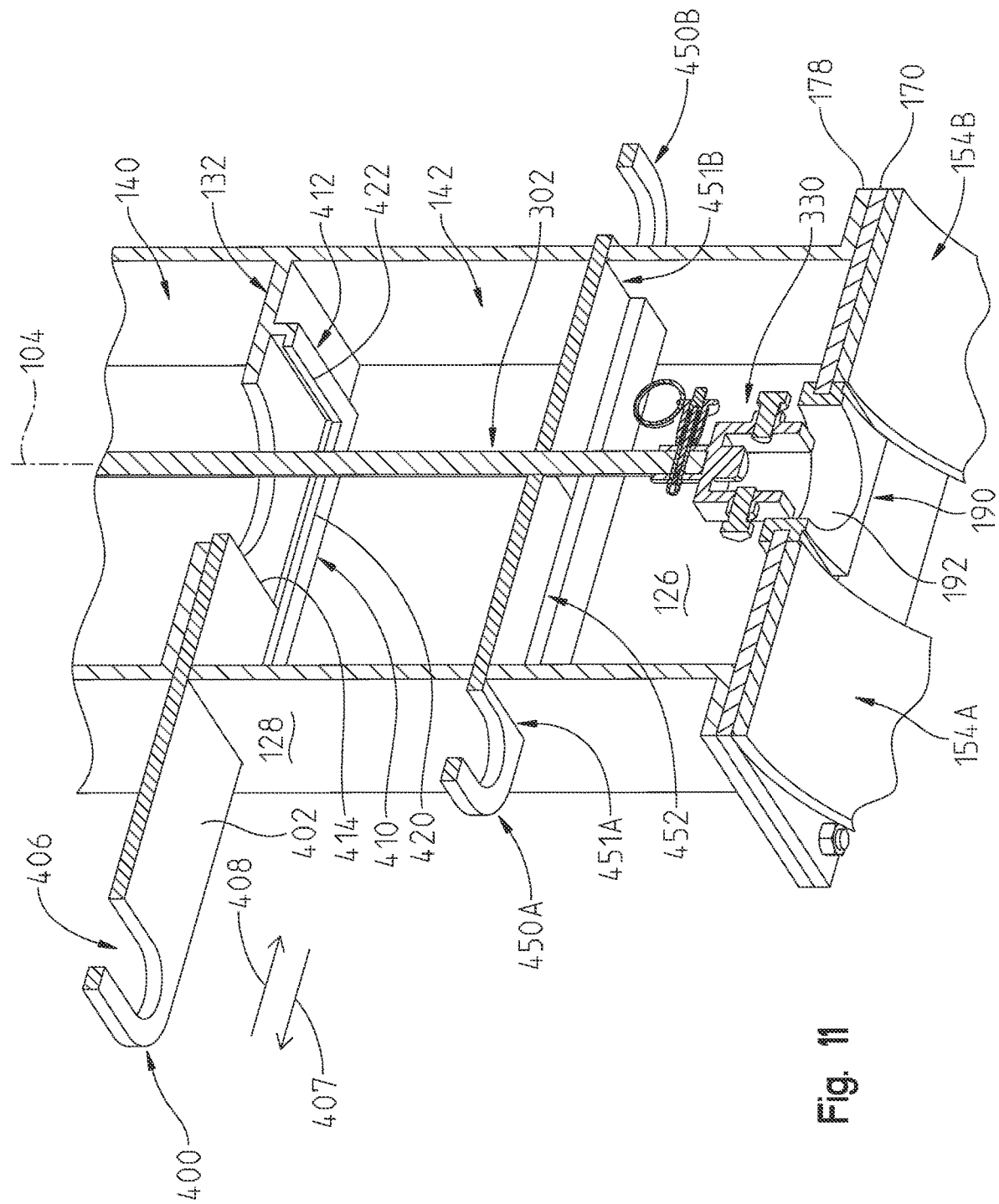
FIG. 11 illustrates a cross-sectional view of the arrangement of FIG. 10 along lines 11-11 in FIG. 10 and a divider of the apparatus in an open configuration.
Figure 12:
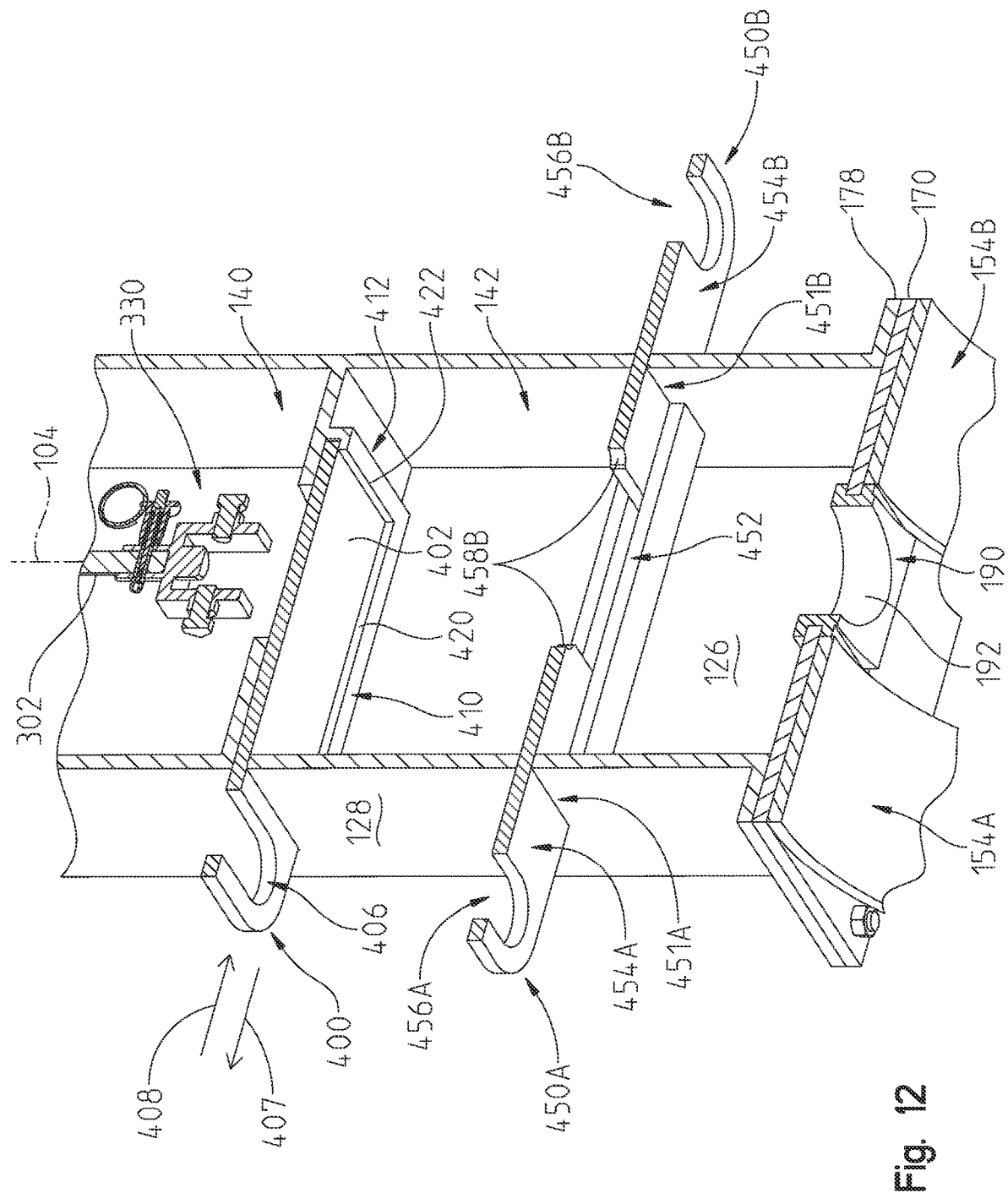
FIG. 12 illustrates a cross-sectional view of the arrangement of FIG. 10 along lines 11-11 in FIG. 10 with the divider of the apparatus in a closed configuration.

As explained herein, movable tool 300 is both rotatable about longitudinal axis 104 of housing 110 and translatable along longitudinal axis 104 of housing 110 such that second end 306 of shaft 302 and the interfaces that are coupled to second end 306 of shaft 302 may be positioned in either of first workspace 140 or second workspace 142 of interior 112 of housing 110. Returning to FIG. 5, apparatus 100 further includes a divider 400 which is movable between a first position (see FIG. 11) wherein movable tool 300 may move from first workspace 140 of interior 112 to second workspace 142 of interior 112 and a second position (see FIG. 12) wherein movable tool 300 is prevented from moving from first workspace 140 of interior 112 to second workspace 142 of interior 112. As shown in FIGS. 11 and 12, divider 400 intersects longitudinal axis 104 of housing 110 when divider 400 is in the second, closed position and is spaced apart from longitudinal axis 104 in the first, open position.

Referring to FIG. 11, divider 400 is shown as a flat body 402 received in an opening 404 in left side 128 of housing 110 (see FIG. 5). Body 402 is received in a guide 410 formed on a lower side of floor 132. Body 402 further includes a handle 406 which may be grasped by an operator to move body 402 relative to housing 110 in direction 407 to position body 402 in the first position wherein movable tool 300 may move between first workspace 140 and second workspace 142 and in direction 408 to position body 402 in the second position wherein movable tool 300 is prevented from moving between first workspace 140 and second workspace 142. The movement of body 402 in direction 408 is limited by a stop 412 which receives a leading edge 414 of body 402. Although body 402 is shown as moving between the first position and the second position through a translational movement, in embodiments, body 402 is moveable between the first position and the second position through a rotational movement, or a combination of one or more translational movements and one or more rotational movements. Additionally although body 402 is shown as being a flat plate, body 402 may take on different shapes and be comprised of multiple pieces coupled together.

Figure 9:
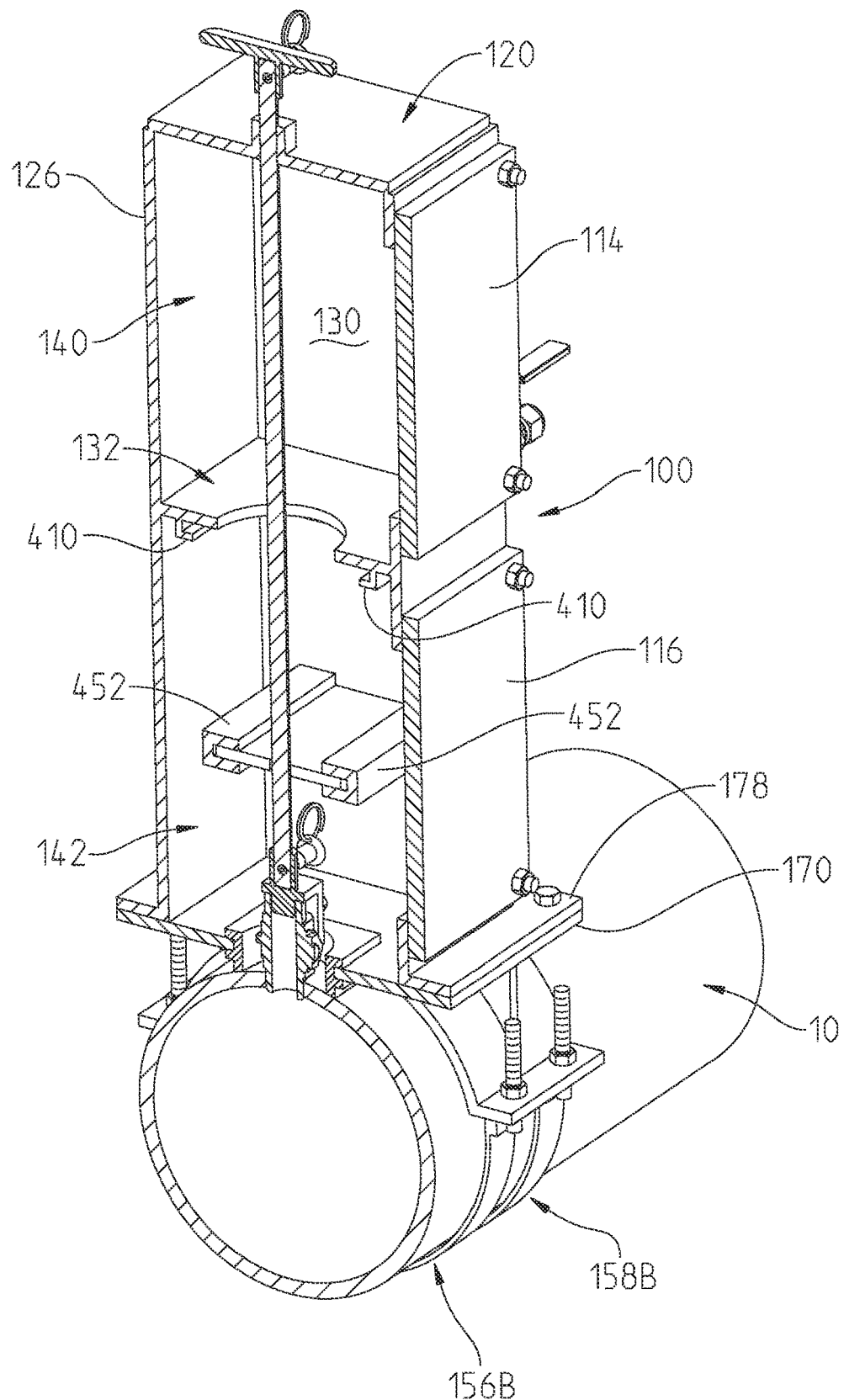
FIG. 9 illustrates a cross-sectional view of the arrangement of FIG. 6 along lines 9-9 in FIG. 6.
Figure 10:
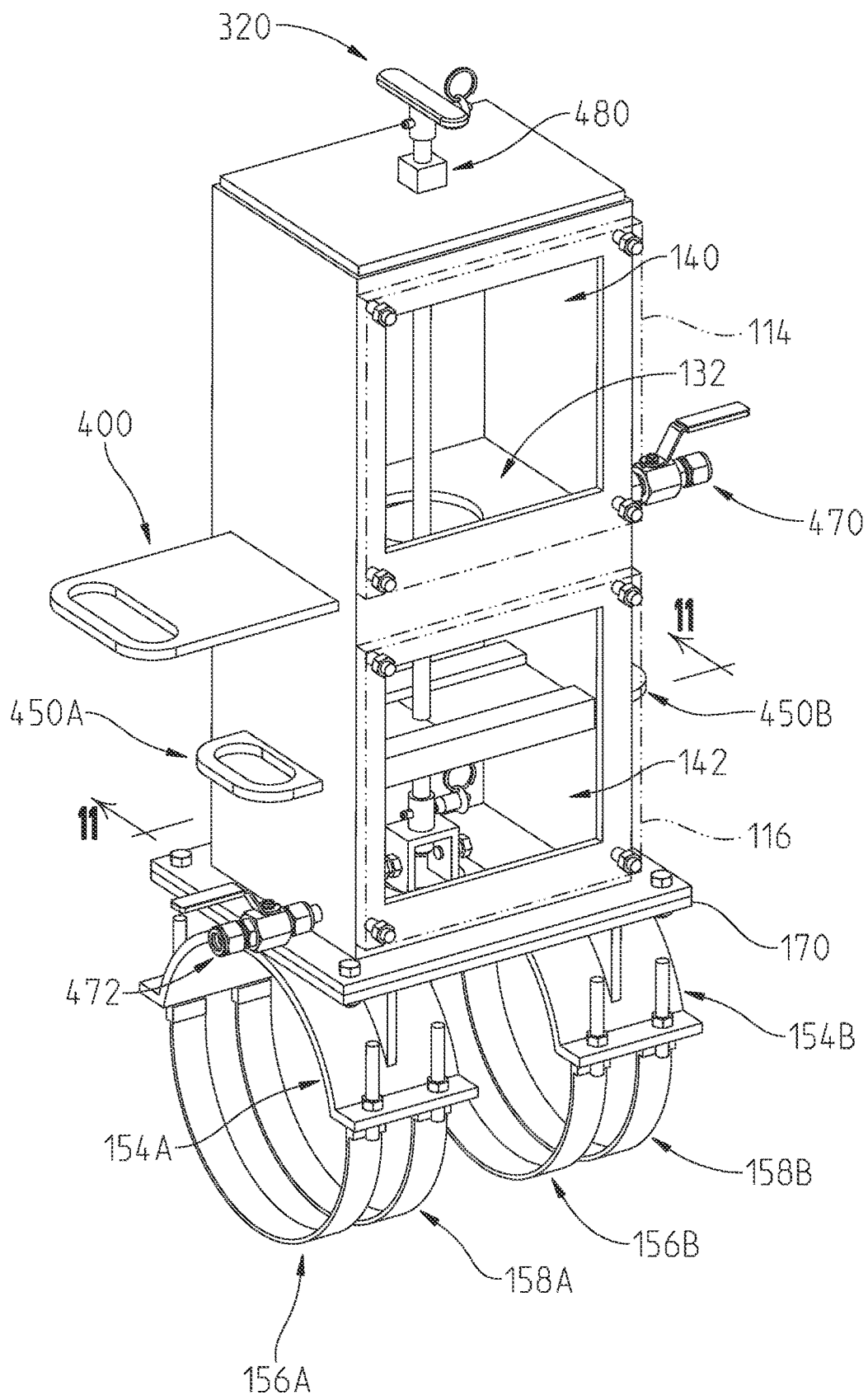
FIG. 10 illustrates the apparatus of FIG. 5 with transparent barriers.

When divider 400 is in the second position, along with preventing movement of movable tool 300 from first workspace 140 to second workspace 142, floor 132, body 402, a lip 420 of guide 410 (as shown in FIG. 9 there is a guide 410 on each side of body 402), and a lip 422 of stop 412 form a tortuous path for fluid such to reduce fluid flow, such as water from water main line 10 entering second workspace 142 moving into first workspace 140. In embodiments, body 402 carries or otherwise receives a seal to further increase the fluid tightness of divider 400. Although a single divider 400 is illustrated, in embodiments, multiple dividers may be used, such as one above floor 132 and one below floor 132. Further, in embodiments, divider 400 may be held in the second position with a latch on the exterior of housing 110 or other mechanical or magnetic devices for holding divider 400 in the second position. In embodiments, body 402 and rear side 126 and front side 124 include cooperating detent features which hold body 402 in the respective first position and second position.

Referring to FIG. 11, apparatus 100 further includes a first alignment member 450 and a second alignment member 450B. Each alignment member 450A, 450B is received in a corresponding opening 451A, 451B in housing 110 (see FIG. 5) and is translatable within a guide 452 (one on each side as shown in FIG. 9) in directions 407 and 408. When each of alignment member 450A and alignment member 450B are moved outward relative to housing 110 (see FIG. 12) they are spaced apart from movable tool 300. When each of alignment member 450A and alignment member 450B are moved inward relative to housing 110 (see FIG. 11) they either contact shaft 302 of movable tool 300 or are spaced apart from shaft 302 by a small distance to capture shaft 302 of movable tool 300 and restrict a movement of moveable tool 300 laterally within second workspace 142 of housing 110. With alignment member 450A and alignment member 450B in the positions shown in FIG. 11, movable tool 300 is still rotatable about longitudinal axis 104 and translatable along longitudinal axis 104 through a limited range. As illustrated, each of alignment member 450A and alignment member 450B is a plate-like body 454 having a handle 456 and a recess 458. Recess 458 receives shaft 302 of movable tool 300 and centers shaft 302 of movable tool 300 on longitudinal axis 104. Alignment member 450A and alignment member 450B may take on different shapes and be comprised of multiple components.

Returning to FIG. 5, first workspace 140 is in selective fluid communication with an exterior of housing 110 through a valve 470 and second workspace 142 is in selective fluid communication with an exterior of housing 110 through a valve 472. A fluid conduit 474 extends through right side 130 of housing 110 and valve 470 is coupled to fluid conduit 474. Similarly, a fluid conduit 476 extends through left side 128 of housing 110 and valve 472 is coupled to fluid conduit 476.

In operation, apparatus 100 is attached to water main line 10 by attaching coupler assembly 150 to water main line 10. Valve 26A is turned off and service line 28A is uncoupled from valve 26A. Base 170 of coupler assembly 150 and upper portion 154A and upper portion 154B are placed on top of the exposed portion of water main line 10 and valve 26A is centered in opening 192 of seal 190. Each of first band 156A, first band 156B, second band 158A, and second band 158B are placed around water main line 10 and secured to upper portion 154A and upper portion 154B, respectively. Coupling assembly 150 is tightened on water main line 10.

Housing 110 is attached to base 170 of coupler assembly 150. If not already assembled to housing 110, movable tool 300 is assembled to housing 110 by feeding second end 306 of shaft 302 through a guide 480 on top 120 of housing 110. Barrier 116 is placed in the second configuration to allow access to second workspace 142 and interface 330 (or interface 370) is attached to shaft 302. Interface 330 (or interface 370) is then coupled to valve 26A as shown in FIG. 8. For interface 330, each of coupler 336 and coupler 340 are threaded into base 332 to engage respective sides of valve 26A. Also, alignment member 450A and alignment member 450B are moved inward to capture shaft 302. Barrier 116 is placed in the first configuration preventing access to second workspace 142 and movable tool 300 is rotated about longitudinal axis 104 to unscrew valve 26A from water main line 10. In embodiments, valve 26A is threaded into a saddle 80 that is attached to water main line 10 instead of water main line 10 directly.

As valve 26A is unscrewed from water main line 10 (or the saddle attached to water main line 10), water from water main line 10 enters second workspace 142 through opening 192 in seal 190. If not already opened, valve 472 may be opened to allow water in second workspace 142 to leave second workspace 142 and be placed in the environment surrounding housing 110. In embodiments, valve 472 is further coupled to a conduit which has an open end located outside of pit 50, such as on top of the ground. Once valve 26A is fully unscrewed from water main line 10 (or the saddle attached to water main line 10) alignment member 450A and alignment member 450B are opened and movable tool 300 is translated along longitudinal axis 104 to position interface 330 and valve 26A above divider 400 in first workspace 140 of housing 110. Divider 400 is closed to divide first workspace 140 from second workspace 142 and limit the amount of water exiting second workspace 142 into first workspace 140. The water in second workspace 142 will generally follow the path of least resistance which would be through valve 472 and its corresponding fluid conduit instead of the tortuous path formed by divider 400 and housing 110.

Valve 470 is opened to drain the water from first workspace 140 that may have entered while divider 400 was open. Barrier 114 is placed in the second configuration to allow access to first workspace 140. Valve 26A is removed from interface 330 of movable tool 300 either while interface 330 is in first workspace 140 or interface 330 is first decoupled from shaft 302 and then valve 26A is removed from interface 330 outside of first workspace 140. Valve 52A is coupled to interface 330 either while interface 330 is in first workspace 140 or while interface 330 is decoupled from shaft 302 in which case the assembly of valve 52A and interface 330 are then coupled to shaft 302. Alternatively, two instances of interface 330 are provided with one already having valve 52A coupled thereto prior to valve 26A being unscrewed from water main line 10 or the corresponding saddle. In this arrangement, the instance of interface 330 coupled to valve 26A is removed in first workspace 140 and replaced with the instance of interface 330 coupled to valve 52A.

Barrier 114 is placed in the first configuration preventing access to first workspace 140 and divider 400 is again opened placing first workspace 140 in fluid communication with second workspace 142. Water will enter first workspace 140. Valve 470 may be closed. Movable tool 300 is translated along longitudinal axis 104 to place valve 52A in second workspace 142 below alignment member 450A and alignment member 450B and alignment member 450A and alignment member 450B are closed. Valve 472 is closed and valve 52A is threaded into water main line 10 or the corresponding saddle by rotating movable tool 300 about longitudinal axis 104. Valve 472 is again opened to allow water in interior 112 of housing 110 to exit and movable barrier 116 is placed in the second configuration to allow access to second workspace 142 of interior 112 of housing 110. Interface 330 is decoupled from valve 52A and housing 110 is uncoupled from water main line 10. Service line 28A is reconnected to water main line 10 through valve 52A or a new service line is connected to valve 52A. While service line 28A is decoupled from both valve 26A and valve 52A, each of valve 30A and valve 42A may be replaced with valve 54A and valve 56A, respectfully.

Figure 14:
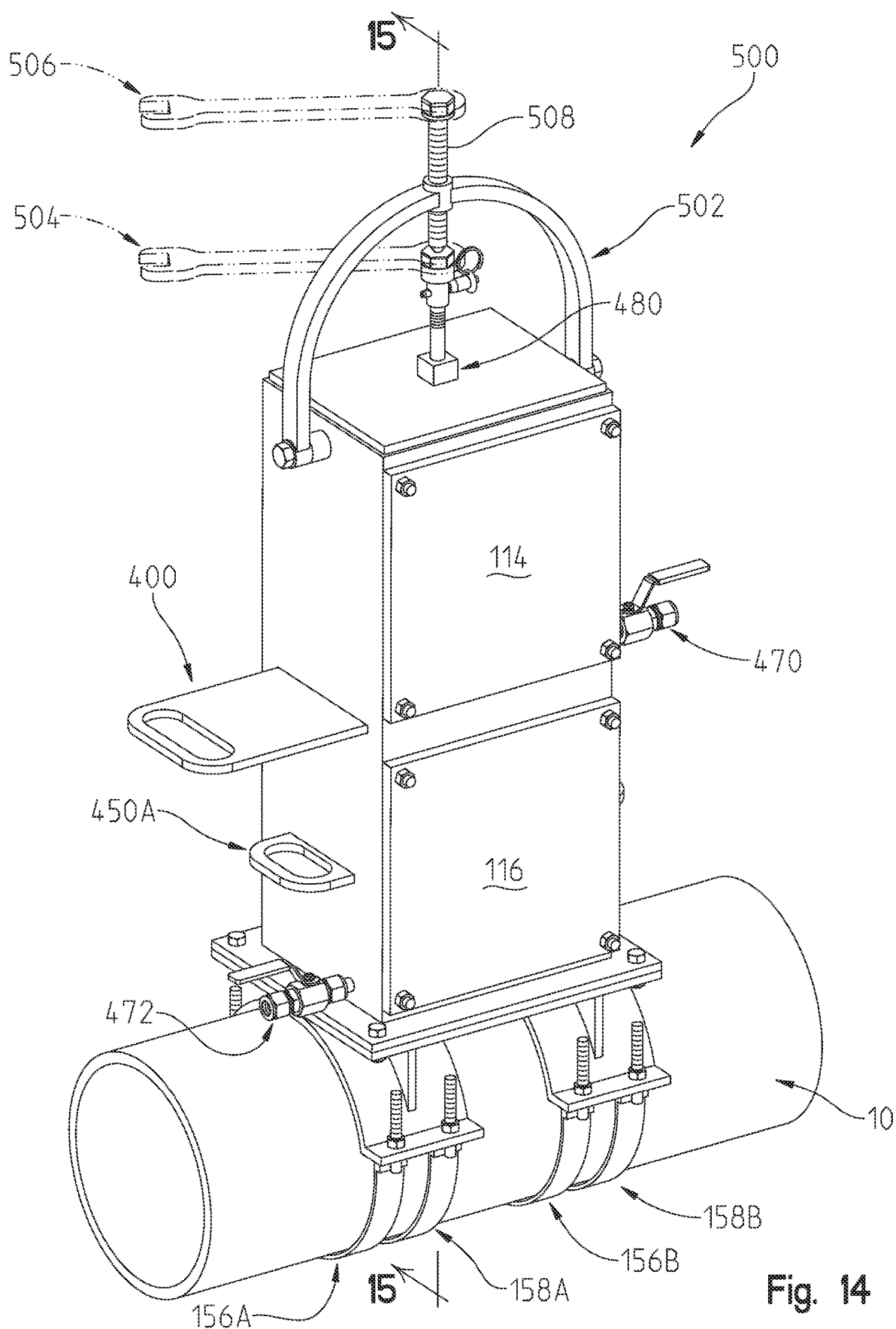
FIG. 14 is another exemplary embodiment of the apparatus of FIG. 5 with a tapping tool.
Figure 15:
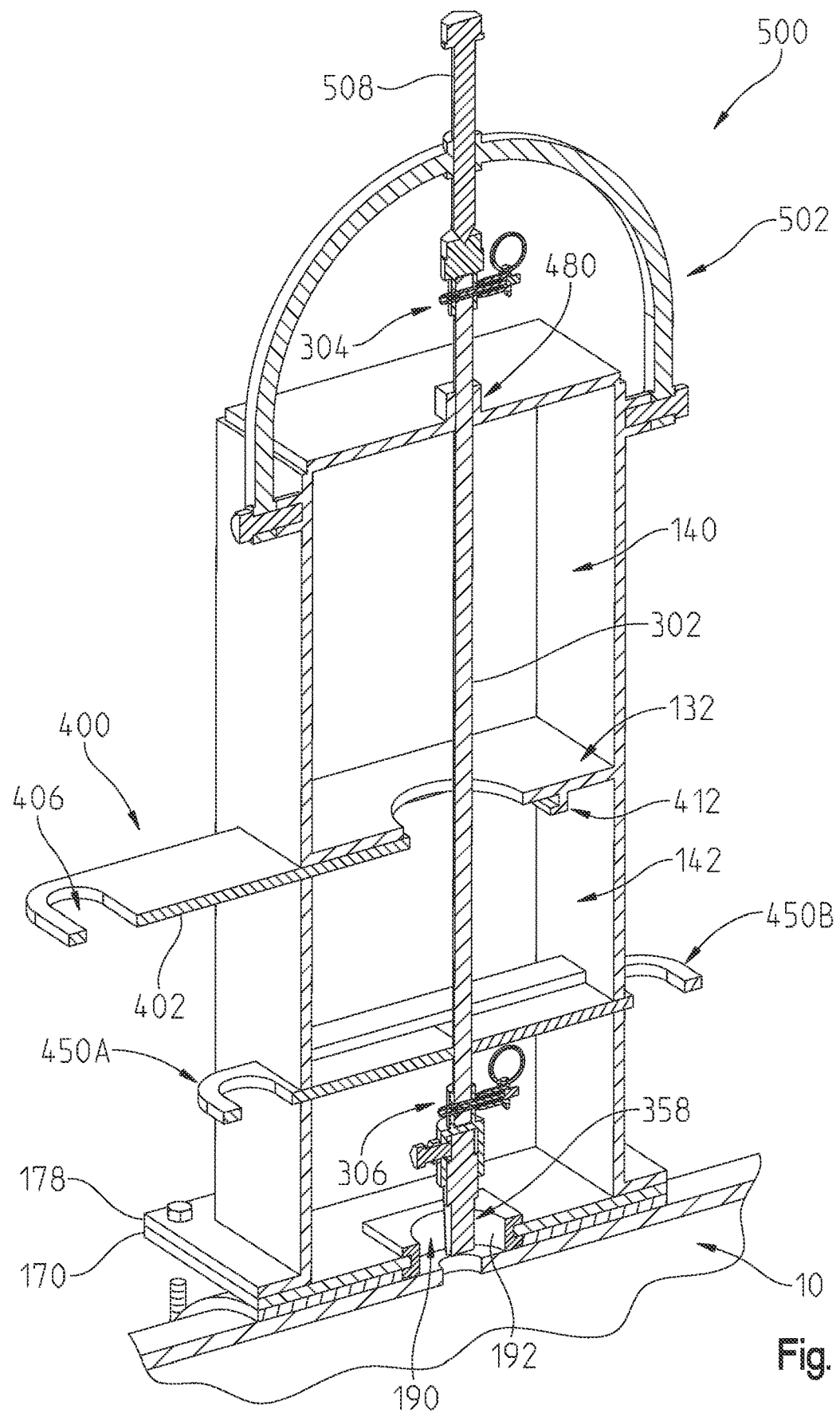
FIG. 15 illustrates a cross-sectional view of the arrangement of FIG. 14 along lines 15-15 in FIG. 14.

In embodiments, the opening in water main line 10 needs to be retapped and once interface 330 with valve 26A is raised to first workspace 140, interface 350 is coupled to shaft 302 in place of interface 330 and lowered back down into second workspace 142. Alignment members 450A, 450B are closed and the opening in water main line 10 is tapped with tap 358 by rotating movable tool 300 about longitudinal axis 104. FIGS. 14 and 15 illustrate a tapping tool 500 attached to first end 304 of shaft 302. Tapping tool 500 includes a yoke 502 coupled to housing 110, a first ratchet 504 to advance tap 358 into the opening in water main line 10 and a second ratchet 506 to advance a stop 508 which applies downward pressure on shaft 302 and hence tap 358. Once tapped, tap 358 may be threaded out of the opening in water main line 10 and moved to first workspace 140 and divider 400 closed. Interface 350 is then removed from shaft 302 and replaced with an instance of interface 330 carrying valve 52A.

The following clauses describe some exemplary embodiments of the present disclosure.

Clause 1. An apparatus for replacing a first valve connected to a water main with a second valve is provided. The apparatus comprising a housing. The housing including a top, a bottom, and at least one side. The housing further including an access opening in the bottom providing access to an interior of the housing and a plurality of openings in the at least one side. The interior of the housing including a plurality of workspaces. The plurality of workspaces including a first workspace and a second workspace. The apparatus further comprising a first movable barrier coupled to the housing and covering at least a first opening of the plurality of openings in the at least one side of the housing in a first configuration and allowing access to the first workspace of the interior of the housing in a second configuration. The apparatus further comprising a second movable barrier coupled to the housing and covering at least a second opening of the plurality of openings in the at least one side of the housing in a first configuration and allowing access to the second workspace of the interior of the housing in a second configuration. The apparatus further comprising a coupling assembly adapted to couple the housing to the water main with the first valve aligned with the access opening in the bottom of the housing. The apparatus further comprising a movable tool at least partially positioned in the interior of the housing. The apparatus further comprising at least one divider movable between a first position wherein the movable tool may move from the first workspace to the second workspace and a second position wherein the movable tool is prevented from moving from the first workspace to the second workspace. The first workspace being positioned closer to the top of the housing than the second workspace.

Clause 2. The apparatus of Clause 1, wherein housing has a longitudinal axis, the at least one divider intersecting the longitudinal axis in the second position and being spaced apart from the longitudinal axis in the first position.

Clause 3. The apparatus of Clause 2, wherein the movable tool is aligned with the longitudinal axis and is both rotatable about the longitudinal axis and translatable along the longitudinal axis.

Clause 4. The apparatus of any one of Clauses 1-3, wherein the movable tool includes an interface configured to couple to the first valve.

Clause 5. The apparatus of Clause 4, wherein the interface of the movable tool is removably coupled to a shaft of the movable tool, the shaft having a length longer than a height of the housing.

Clause 6. The apparatus of any one of Clauses 4 and 5, wherein the interface of the movable tool includes a base having a recess to receive the first valve. The interface further includes a first coupler positionable on a first side of the first valve and movable between a first position spaced apart from the first valve and a second position contacting the first side of the first valve. The interface further includes a second coupler positionable on a second side of the first valve and movable between a first position spaced apart from the first valve and a second position contacting the second side of the first valve.

Clause 7. The apparatus of Clause 4, wherein the interface is adapted to receive an end of the first valve and a fastener which engages a sidewall of the first valve.

Clause 8. The apparatus of any one of Clauses 4-7, wherein the interface of the movable tool is configured to be decoupled from the shaft and replaced with a second interface of the movable tool, the second interface configured to engage the water main.

Clause 9. The apparatus of Clause 8, wherein the second interface includes a drill bit adapted to increase an opening in the water main from a first size to a second size.

Clause 10. The apparatus of Clause 8, wherein the second interface includes a tap adapted to tap threads in an opening in the water main.

Clause 11. The apparatus of any one of Clauses 1-10, further comprising a first valve actuatable from an exterior of the housing and in fluid communication with the first workspace of the interior of the housing and a second valve actuatable from the exterior of the housing and in fluid communication with the second workspace of the interior of the housing.

Clause 12. The apparatus of any one of Clauses 1-11, wherein the movable tool is actuatable from an exterior of the housing.

Clause 13. The apparatus of any one of Clauses 1-12, wherein the at least one divider is actuatable from an exterior of the housing to move the at least one divider between the first position and the second position.

Clause 14. The apparatus of Clause 13, wherein the at least one divider is translatable between the first position and the second position.

Clause 15. The apparatus of any one of Clauses 1-14, wherein the first movable barrier permits visual inspection of the first workspace of the interior of the housing in the first configuration and the second movable barrier permits visual inspection of the second workspace of the interior of the housing in the first configuration.

Clause 16. The apparatus of Clause 15, wherein the first movable barrier includes at least a transparent portion and the second movable barrier includes at least a transparent portion.

Clause 17. The apparatus of any one of Clauses 1-16, wherein the coupling assembly is adapted to surround a water main line of the water main.

Clause 18. The apparatus of Clause 17, wherein the coupling assembly includes a base having an opening. The coupling assembly further includes a first saddle. The first saddle is positioned on a first side of the opening in the base. The coupling assembly further includes a second saddle positioned on a second side of the opening in the base such that the opening in the base is between the first saddle and the second saddle.

Clause 19. The apparatus of Clause 18, wherein the base is coupled to the bottom the housing.

Clause 20. The apparatus of Clause 19, wherein the coupling assembly further includes a seal positioned in the opening in the base. The seal including an opening through which the first valve may be accessed from the interior of the housing when the apparatus is coupled to the water main line. The seal directing water from the water main above the base into the interior of the housing and limiting water from the water main being discharged from underneath the base.

Clause 21. The apparatus of any one of Clauses 1-20, further comprising at least one alignment member which in a first position relative to the housing is spaced a first distance from the movable tool to restrict a movement of the moveable tool laterally within the second workspace of the housing and in a second position relative to the housing is spaced a second distance from the movable tool, the second distance being greater than the first distance.

Clause 22. The apparatus of any one of Clauses 1-20, further comprising a plurality of alignment members which are movable relative to the housing to capture a shaft of the moveable tool in the second workspace of the housing to restrict a movement of the moveable tool laterally within the second workspace of the housing.

Clause 23. The apparatus of Clause 1, wherein the water main includes a water main line.

Clause 24. The apparatus of Clause 1, wherein the water main includes a water main line and a saddle coupled to the water main line.

Clause 25. A method of replacing a first valve coupled to a water main with a second valve with the apparatus of Clause 1, the method comprising the steps of: (a) coupling the movable tool to the first valve; (b) rotatably actuating the movable tool to decouple the first valve from the water main; (c) moving the first valve with the movable tool from the second workspace of the interior of the housing to the first workspace of the interior of the housing; (d) moving the at least one divider from the first position to the second position; (e) placing the first movable barrier in the second configuration to permit access to the first workspace of the interior of the housing from an exterior of the housing; (f) decoupling the first valve from the movable tool within the first workspace of the interior of the housing; (g) coupling the second valve to the movable tool within the first workspace of the interior of the housing; (h) placing the first movable barrier in the first configuration; (i) moving the at least one divider from the second position to the first position; (j) moving the second valve with the movable tool from the first workspace of the interior of the housing to the second workspace of the interior of the housing; and (k) rotatably actuating the movable tool to couple the second valve to the water main.

Clause 26. The method of Clause 25, further comprising: (l) prior to step (e) opening a drain valve in fluid communication with the second workspace of the interior of the housing to communicate water from the second workspace of the interior of the housing to a location located outside of the housing; and (m) prior to step (k) and subsequent to step (h) closing the drain valve in fluid communication with the second workspace of the interior of the housing.

Clause 27. The method Clause 26, further comprising: (n) subsequent to step (e) opening another drain valve in fluid communication with the first workspace of the interior of the housing to communicate water from the first workspace of the interior of the housing to the exterior of the housing; and (m) prior to step (k) closing the another drain valve in fluid communication with the first workspace of the interior of the housing.

Clause 28. The method any one of Clause 25-27, further comprising subsequent to step (b) and prior to step (k): (o) coupling a drill bit to the movable tool; (p) enlarging an opening in the water main to which the first valve was connected from a first size to a second size; and (q) tapping the opening of the second size.

Although the invention has been described in detail with reference to certain preferred embodiments, variations and modifications exist within the spirit and scope of the invention as described and defined in the following claims.

The invention claimed is:

1. An apparatus for replacing a first valve connected to a water main with a second valve, the apparatus comprising:
    a housing including a top, a bottom, and at least one side, the housing further including an access opening in the bottom providing access to an interior of the housing and a plurality of openings in the at least one side, the interior of the housing including a plurality of workspaces, the plurality of workspaces including a first workspace and a second workspace;

a first movable barrier coupled to the housing and covering at least a first opening of the plurality of openings in the at least one side of the housing in a first configuration and allowing access to the first workspace of the interior of the housing in a second configuration;

a second movable barrier coupled to the housing and covering at least a second opening of the plurality of openings in the at least one side of the housing in a first configuration and allowing access to the second workspace of the interior of the housing in a second configuration;

a coupling assembly adapted to couple the housing to the water main with the first valve aligned with the access opening in the bottom of the housing;

a movable tool at least partially positioned in the interior of the housing;

at least one divider movable between a first position wherein the movable tool may move from the first workspace to the second workspace and a second position wherein the movable tool is prevented from moving from the first workspace to the second workspace, the first workspace being positioned closer to the top of the housing than the second workspace.

2. The apparatus of claim 1, wherein housing has a longitudinal axis, the at least one divider intersecting the longitudinal axis in the second position and being spaced apart from the longitudinal axis in the first position.

3. The apparatus of claim 2, wherein the movable tool is aligned with the longitudinal axis and is both rotatable about the longitudinal axis and translatable along the longitudinal axis.

4. The apparatus of claim 1, wherein the movable tool includes an interface configured to couple to the first valve.

5. The apparatus of claim 4, wherein the interface of the movable tool is removably coupled to a shaft of the movable tool, the shaft having a length longer than a height of the housing.

6. The apparatus of claim 4, wherein the interface of the movable tool includes a base having a recess to receive the first valve, a first coupler positionable on a first side of the first valve and movable between a first position spaced apart from the first valve and a second position contacting the first side of the first valve, and a second coupler positionable on a second side of the first valve and movable between a first position spaced apart from the first valve and a second position contacting the second side of the first valve.

7. The apparatus of claim 4, wherein the interface is adapted to receive an end of the first valve and a fastener which engages a sidewall of the first valve.

8. The apparatus of claim 4, wherein the interface of the movable tool is configured to be decoupled from the shaft and replaced with a second interface of the movable tool, the second interface configured to engage the water main.

9. The apparatus of claim 8, wherein the second interface includes a drill bit adapted to increase an opening in the water main from a first size to a second size.

10. The apparatus of claim 8, wherein the second interface includes a tap adapted to tap threads in an opening in the water main.

11. The apparatus of claim 1, further comprising a first valve actuatable from an exterior of the housing and in fluid communication with the first workspace of the interior of the housing and a second valve actuatable from the exterior of the housing and in fluid communication with the second workspace of the interior of the housing.

12. The apparatus of claim 1, wherein the movable tool is actuatable from an exterior of the housing.

13. The apparatus of claim 1, wherein the at least one divider is actuatable from an exterior of the housing, to move the at least one divider between the first position and the second position.

14. The apparatus of claim 13, wherein the at least one divider is translatable between the first position and the second position.

15. The apparatus of claim 1, wherein the first movable barrier permits visual inspection of the first workspace of the interior of the housing in the first configuration and the second movable barrier permits visual inspection of the second workspace of the interior of the housing in the first configuration.

16. The apparatus of claim 15, wherein the first movable barrier includes at least a transparent portion and the second movable barrier includes at least a transparent portion.

17. The apparatus of claim 1, wherein the coupling assembly is adapted to surround a water main line of the water main.

18. The apparatus of claim 17, wherein the coupling assembly includes a base having an opening, a first saddle positioned on a first side of the opening in the base and a second saddle positioned on a second side of the opening in the base such that the opening in the base is between the first saddle and the second saddle.

19. The apparatus of claim 18, wherein the base is coupled to the bottom the housing.

20. The apparatus of claim 19, wherein the coupling assembly further includes a seal positioned in the opening in the base, the seal including an opening through which the first valve may be accessed from the interior of the housing when the apparatus is coupled to the water main line, the seal directing water from the water main above the base into the interior of the housing and limiting water from the water main being discharged from underneath the base.

21. The apparatus of claim 1, further comprising at least one alignment member which in a first position relative to the housing is spaced a first distance from the movable tool to restrict a movement of the moveable tool laterally within the second workspace of the housing and in a second position relative to the housing is spaced a second distance from the movable tool, the second distance being greater than the first distance.

22. The apparatus of claim 1, further comprising a plurality of alignment members which are movable relative to the housing to capture a shaft of the moveable tool in the second workspace of the housing to restrict a movement of the moveable tool laterally within the second workspace of the housing.

23. The apparatus of claim 1, wherein the water main includes a water main line.

24. The apparatus of claim 1, wherein the water main includes a water main line and a saddle coupled to the water main line.

25. A method of replacing a first valve coupled to a water main with a second valve with the apparatus of claim 1, the method comprising the steps of:
   (a) coupling the movable tool to the first valve;
   (b) rotatably actuating the movable tool to decouple the first valve from the water main;
   (c) moving the first valve with the movable tool from the second workspace of the interior of the housing to the first workspace of the interior of the housing;
   (d) moving the at least one divider from the first position to the second position;

(e) placing the first movable barrier in the second configuration to permit access to the first workspace of the interior of the housing from an exterior of the housing;

(f) decoupling the first valve from the movable tool within the first workspace of the interior of the housing;

(g) coupling the second valve to the movable tool within the first workspace of the interior of the housing;

(h) placing the first movable barrier in the first configuration;

(i) moving the at least one divider from the second position to the first position;

(j) moving the second valve with the movable tool from the first workspace of the interior of the housing to the second workspace of the interior of the housing; and (k) rotatably actuating the movable tool to couple the second valve to the water main.

26. The method of claim 25, further comprising:

(l) prior to step (e) opening a drain valve in fluid communication with the second workspace of the interior of the housing to communicate water from the second workspace of the interior of the housing to a location located outside of the housing; and (m) prior to step (k) and subsequent to step (h) closing the drain valve in fluid communication with the second workspace of the interior of the housing.

27. The method of claim 26, further comprising:

(n) subsequent to step (e) opening another drain valve in fluid communication with the first workspace of the interior of the housing to communicate water from the first workspace of the interior of the housing to the exterior of the housing; and (m) prior to step (k) closing the another drain valve in fluid communication with the first workspace of the interior of the housing.

28. The method of claim 25, further comprising subsequent to step (b) and prior to step (k):

(o) coupling a drill bit to the movable tool;

(p) enlarging an opening in the water main to which the first valve was connected from a first size to a second size; and (q) tapping the opening of the second size.

* * * * *